United States Patent
Kohlmann

(10) Patent No.: US 8,135,055 B2
(45) Date of Patent: Mar. 13, 2012

(54) I/Q CALIBRATION OF TRANSMIT AND RECEIVE PATHS IN OFDM FDD COMMUNICATION SYSTEMS

(75) Inventor: Michael Kohlmann, Los Gatos, CA (US)

(73) Assignee: Qualcomm Incorporated, San Diego, CA (US)

( * ) Notice: Subject to any disclaimer, the term of this patent is extended or adjusted under 35 U.S.C. 154(b) by 732 days.

(21) Appl. No.: 12/182,333

(22) Filed: Jul. 30, 2008

(65) Prior Publication Data

US 2010/0027689 A1 Feb. 4, 2010

(51) Int. Cl.
*H04B 3/46* (2006.01)

(52) U.S. Cl. ........ 375/224; 375/219; 375/228; 375/260; 375/295; 375/316; 455/67.11; 455/67.13; 455/67.14; 455/115.1; 455/115.2; 455/115.3; 455/115.4; 455/226.1; 455/296; 324/76.11; 370/241

(58) Field of Classification Search ........... 375/219, 375/260, 293, 295, 297–298, 316, 224, 228, 375/285; 455/86, 296, 305, 324; 324/76.11; 370/241

See application file for complete search history.

(56) References Cited

U.S. PATENT DOCUMENTS

| | | | |
|---|---|---|---|
| 7,274,750 B1 * | 9/2007 | Mueller | 375/297 |
| 7,280,805 B2 * | 10/2007 | Xu et al. | 455/67.11 |
| 7,539,268 B2 * | 5/2009 | Fechtel | 375/296 |
| 7,831,215 B2 * | 11/2010 | Park et al. | 455/88 |
| 7,856,048 B1 * | 12/2010 | Smaini et al. | 375/221 |
| 2004/0203472 A1 * | 10/2004 | Chien | 455/68 |
| 2006/0034356 A1 * | 2/2006 | Fechtel | 375/219 |
| 2009/0325516 A1 * | 12/2009 | Safavi | 455/126 |

OTHER PUBLICATIONS

Dengwei Fu "A Simultaneous TX and RX I/Q Imbalance Calibration Method", IEEE May 2008.*
Debaillie B et al: "Calibration Method Enabling Low-Cost SDR" Communications, 2008. ICC '08. IEEE International Conference on, IEEE, Piscataway, NJ, USA, May 19, 2008, pp. 4899-4903, XP031266239 ISBN: 978-1-4244-2075-9 the whole document.
International Search Report & Written Opinion—PCT/US2009/052247 International Search Authority—European Patent Office—Dec. 4, 2009.

* cited by examiner

*Primary Examiner* — Chieh M Fan
*Assistant Examiner* — Sophia Vlahos
(74) *Attorney, Agent, or Firm* — Jonathan T. Velasco; Eric Ho

(57) ABSTRACT

I/Q gain and phase mismatches of both transmit and receive paths of an OFDM FDD transceiver are simultaneously estimated. An up-converted RF signal is generated when the transmit path performs IQ modulation on a reference signal having a single sideband tone. The up-converted RF signal is sent via a loop-back path to the receive path. A down-converted evaluation signal is generated when the receive path performs IQ demodulation on the up-converted RF signal. The single evaluation signal is used to determine the transmit path gain and phase mismatches and the receive path gain and phase mismatches. The four I/Q mismatches are estimated without using significant hardware nut otherwise used in the regular transmission of data signals. The I/Q mismatches in data signals are corrected by pre-processing the up-converted RF signals and post-processing the down-converted RF signals by adding attenuated components of the in-phase and quadrature-phase signals to each other.

42 Claims, 11 Drawing Sheets

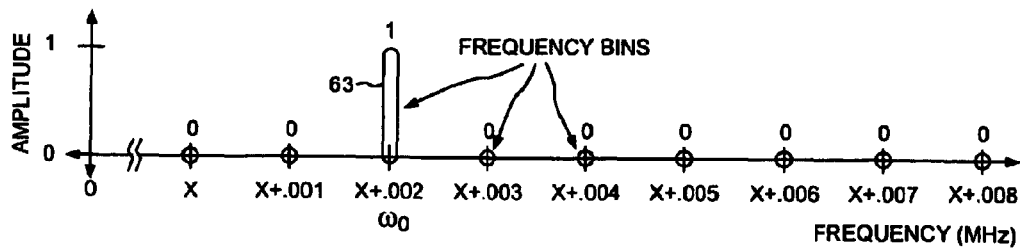

FIG. 3

$$x(t) = e^{j\omega_0 t} = \cos(\omega_0 t) + j\sin(\omega_0 t) = \frac{1}{2}\left(e^{j\omega_0 t} + e^{-j\omega_0 t}\right) + j\frac{1}{2j}\left(e^{j\omega_0 t} - e^{-j\omega_0 t}\right) \quad\overset{66}{}$$

FIG. 4

$$\Re\{a(t)\} = \left(1+\frac{\varepsilon_a}{2}\right)\cos\left(\omega_a t + \frac{\varphi_a}{2}\right) = \left(\frac{2+\varepsilon_a}{4}\right)\left(e^{j\left(\omega_a t + \frac{\varphi_a}{2}\right)} + e^{-j\left(\omega_a t + \frac{\varphi_a}{2}\right)}\right) \quad (79)$$

$$\Im\{a(t)\} = \left(1-\frac{\varepsilon_a}{2}\right)\sin\left(\omega_a t - \frac{\varphi_a}{2}\right) = \left(\frac{2-\varepsilon_a}{4j}\right)\left(e^{j\left(\omega_a t - \frac{\varphi_a}{2}\right)} - e^{-j\left(\omega_a t - \frac{\varphi_a}{2}\right)}\right) \quad (80)$$

FIG. 5

$$\Re\{x(t)\cdot a(t)\} \quad\overset{84}{}$$

$$= \left(\frac{2+\varepsilon_a}{8}\right)\left(e^{j\left((\omega_a+\omega_b)t+\frac{\varphi_a}{2}\right)} + e^{j\left((\omega_a-\omega_b)t+\frac{\varphi_a}{2}\right)} + e^{-j\left((\omega_a-\omega_b)t-\frac{\varphi_a}{2}\right)} + e^{-j\left((\omega_a-\omega_b)t+\frac{\varphi_a}{2}\right)}\right)$$

$$+ \left(\frac{2-\varepsilon_a}{8}\right)\left(e^{j\left((\omega_a+\omega_b)t-\frac{\varphi_a}{2}\right)} - e^{j\left((\omega_a-\omega_b)t-\frac{\varphi_a}{2}\right)} - e^{-j\left((\omega_a-\omega_b)t-\frac{\varphi_a}{2}\right)} + e^{-j\left((\omega_a+\omega_b)t-\frac{\varphi_a}{2}\right)}\right)$$

FIG. 6

$$\Re\{b(t)\} = \left(1 + \frac{\varepsilon_b}{2}\right)\cos\left(\omega_b t + \frac{\varphi_b}{2}\right) = \left(\frac{2+\varepsilon_b}{4}\right)\left(e^{j\left(\omega_b t + \frac{\varphi_b}{2}\right)} + e^{-j\left(\omega_b t + \frac{\varphi_b}{2}\right)}\right) \quad (91)$$

$$\Im\{b(t)\} = \left(1 - \frac{\varepsilon_b}{2}\right)\sin\left(\omega_b t - \frac{\varphi_b}{2}\right) = \left(\frac{2-\varepsilon_b}{4j}\right)\left(e^{j\left(\omega_b t - \frac{\varphi_b}{2}\right)} - e^{-j\left(\omega_b t - \frac{\varphi_b}{2}\right)}\right) \quad (92)$$

FIG. 7

$$\Re\{c(t) * b(t)\} = \beta \cdot \Re\{b(t-\tau)\} = \beta \cdot \left(\frac{2+\varepsilon_b}{4}\right)\left(e^{j\left(\omega_b(t-\tau) + \frac{\varphi_b}{2}\right)} + e^{-j\left(\omega_b(t-\tau) + \frac{\varphi_b}{2}\right)}\right) \quad (94)$$

$$\Im\{c(t) * b(t)\} = \beta \cdot \Im\{b(t-\tau)\} = \beta \cdot \left(\frac{2-\varepsilon_b}{4j}\right)\left(e^{j\left(\omega_b(t-\tau) - \frac{\varphi_b}{2}\right)} - e^{-j\left(\omega_b(t-\tau) - \frac{\varphi_b}{2}\right)}\right) \quad (95)$$

FIG. 8

$$\Re\{x(t)\cdot c(t)\}\cdot b(t)*c(t)$$

$$= \beta \cdot \left(\frac{2+\varepsilon_a}{8}\right)\left(\frac{2+\varepsilon_b}{4}\right)\left(e^{j\left((\omega_a-\omega_b+\omega_b)t-\omega_b\tau+\frac{\varphi_b-\varphi_a}{2}\right)} + e^{j\left((\omega_a-\omega_b-\omega_b)t+\omega_b\tau+\frac{\varphi_b-\varphi_a}{2}\right)} + e^{-j\left((\omega_a-\omega_b-\omega_b)t+\omega_b\tau-\frac{\varphi_b-\varphi_a}{2}\right)} + e^{-j\left((\omega_a-\omega_b+\omega_b)t-\omega_b\tau-\frac{\varphi_b-\varphi_a}{2}\right)}\right)$$

$$+ \beta \cdot \left(\frac{2+\varepsilon_a}{8}\right)\left(\frac{2-\varepsilon_b}{4}\right)\left(-e^{j\left((\omega_a-\omega_b+\omega_b)t+\omega_b\tau-\frac{\varphi_b+\varphi_a}{2}\right)} - e^{j\left((\omega_a-\omega_b-\omega_b)t-\omega_b\tau-\frac{\varphi_b+\varphi_a}{2}\right)} + e^{-j\left((\omega_a-\omega_b-\omega_b)t-\omega_b\tau+\frac{\varphi_b+\varphi_a}{2}\right)} + e^{-j\left((\omega_a-\omega_b+\omega_b)t+\omega_b\tau+\frac{\varphi_b+\varphi_a}{2}\right)}\right)$$

$$+ \beta \cdot \left(\frac{2-\varepsilon_a}{8}\right)\left(\frac{2+\varepsilon_b}{4}\right)\left(e^{j\left((\omega_a-\omega_b+\omega_b)t-\omega_b\tau+\frac{\varphi_b+\varphi_a}{2}\right)} - e^{j\left((\omega_a-\omega_b-\omega_b)t+\omega_b\tau+\frac{\varphi_b+\varphi_a}{2}\right)} - e^{-j\left((\omega_a-\omega_b-\omega_b)t+\omega_b\tau-\frac{\varphi_b+\varphi_a}{2}\right)} - e^{-j\left((\omega_a-\omega_b+\omega_b)t-\omega_b\tau-\frac{\varphi_b+\varphi_a}{2}\right)}\right)$$

$$+ \beta \cdot \left(\frac{2-\varepsilon_a}{8}\right)\left(\frac{2-\varepsilon_b}{4}\right)\left(-e^{j\left((\omega_a-\omega_b+\omega_b)t+\omega_b\tau-\frac{\varphi_b-\varphi_a}{2}\right)} + e^{j\left((\omega_a-\omega_b-\omega_b)t-\omega_b\tau-\frac{\varphi_b-\varphi_a}{2}\right)} - e^{-j\left((\omega_a-\omega_b-\omega_b)t-\omega_b\tau+\frac{\varphi_b-\varphi_a}{2}\right)} + e^{-j\left((\omega_a-\omega_b+\omega_b)t+\omega_b\tau+\frac{\varphi_b-\varphi_a}{2}\right)}\right)$$

FIG. 9

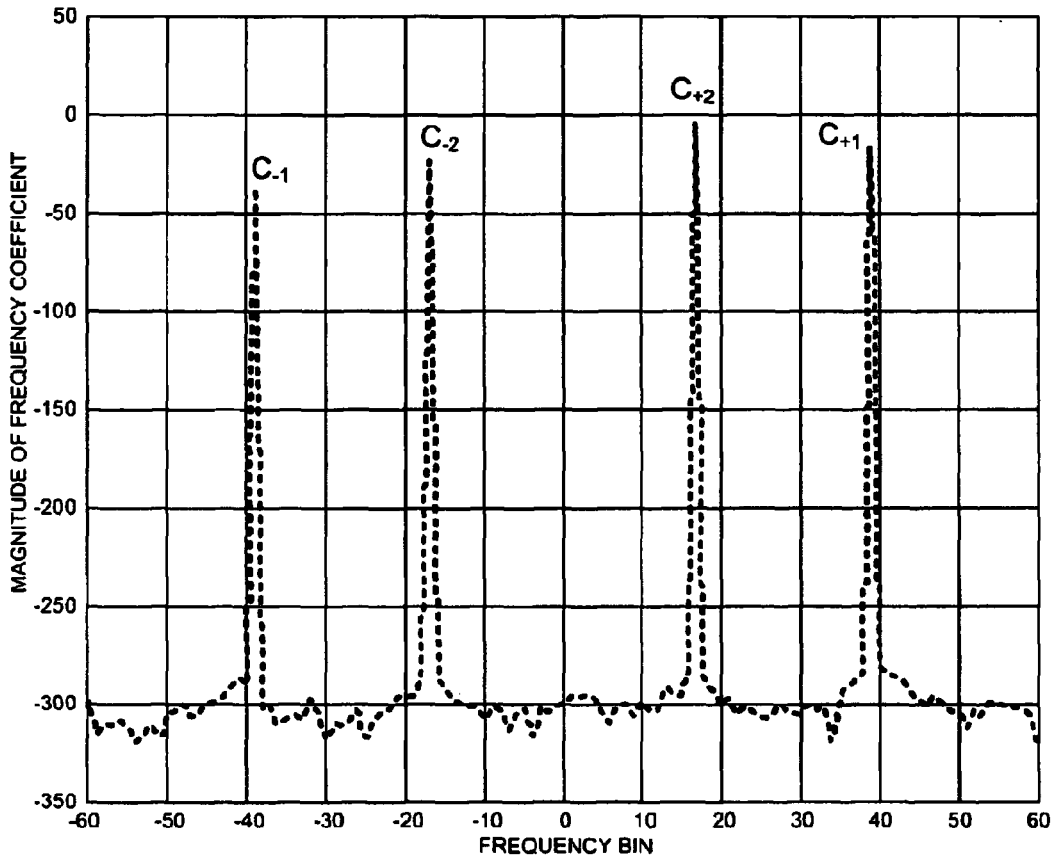

OUTPUT OF FFT BLOCK IN ESTIMATION MODE

FIG. 10

$$\begin{bmatrix} C'_{+1} \\ C'_{+2} \\ C'_{-1} \\ C'_{-2} \end{bmatrix} = \beta \cdot \begin{bmatrix} +e^{j\left(\frac{\varphi_a-\varphi_b}{2}\right)} & -e^{j\left(\frac{\varphi_a+\varphi_b}{2}\right)} & +e^{-j\left(\frac{\varphi_a+\varphi_b}{2}\right)} & -e^{-j\left(\frac{\varphi_a-\varphi_b}{2}\right)} \\ +e^{j\left(\frac{\varphi_a-\varphi_b}{2}\right)} & -e^{j\left(\frac{\varphi_a-\varphi_b}{2}\right)} & -e^{-j\left(\frac{\varphi_a-\varphi_b}{2}\right)} & +e^{-j\left(\frac{\varphi_a-\varphi_b}{2}\right)} \\ +e^{-j\left(\frac{\varphi_a-\varphi_b}{2}\right)} & +e^{-j\left(\frac{\varphi_a+\varphi_b}{2}\right)} & +e^{j\left(\frac{\varphi_a+\varphi_b}{2}\right)} & +e^{j\left(\frac{\varphi_a-\varphi_b}{2}\right)} \\ +e^{-j\left(\frac{\varphi_a-\varphi_b}{2}\right)} & +e^{-j\left(\frac{\varphi_a+\varphi_b}{2}\right)} & -e^{j\left(\frac{\varphi_a-\varphi_b}{2}\right)} & -e^{j\left(\frac{\varphi_a-\varphi_b}{2}\right)} \end{bmatrix} \begin{bmatrix} \left(\frac{2+\varepsilon_a}{8}\right)\left(\frac{2+\varepsilon_b}{4}\right) \cdot e^{j(\omega_1\tau)} \\ \left(\frac{2+\varepsilon_a}{8}\right)\left(\frac{2-\varepsilon_b}{4}\right) \cdot e^{j(\omega_2\tau)} \\ \left(\frac{2-\varepsilon_a}{8}\right)\left(\frac{2+\varepsilon_b}{4}\right) \cdot e^{-j(\omega_3\tau)} \\ \left(\frac{2-\varepsilon_a}{8}\right)\left(\frac{2-\varepsilon_b}{4}\right) \cdot e^{-j(\omega_4\tau)} \end{bmatrix}$$

$$K_{++} = \left(\frac{2+\varepsilon_a}{8}\right)\left(\frac{2+\varepsilon_b}{4}\right); K_{+-} = \left(\frac{2+\varepsilon_a}{8}\right)\left(\frac{2-\varepsilon_b}{4}\right)$$

$$K_{-+} = \left(\frac{2-\varepsilon_a}{8}\right)\left(\frac{2+\varepsilon_b}{4}\right); K_{--} = \left(\frac{2-\varepsilon_a}{8}\right)\left(\frac{2-\varepsilon_b}{4}\right)$$

FIG. 12

$$\varphi_+ = \frac{\varphi_a + \varphi_b}{2}; \varphi_- = \frac{\varphi_a - \varphi_b}{2}$$

FIG. 13

$$\begin{bmatrix} \Re\{C_{+1}\} \\ \Re\{C_{+2}\} \\ \Re\{C_{-1}\} \\ \Re\{C_{-2}\} \end{bmatrix} = \beta \cdot \begin{bmatrix} +1 & -1 & +1 & -1 \\ +1 & -1 & -1 & +1 \\ +1 & +1 & +1 & +1 \\ +1 & +1 & -1 & -1 \end{bmatrix} \cdot \begin{bmatrix} K_{++}\cos(\varphi_- + \gamma) \\ K_{+-}\cos(\varphi_+ + \gamma) \\ K_{-+}\cos(\varphi_+ - \gamma) \\ K_{--}\cos(\varphi_- - \gamma) \end{bmatrix} \quad (107)$$

$$\begin{bmatrix} \Im\{C_{+1}\} \\ \Im\{C_{+2}\} \\ \Im\{C_{-1}\} \\ \Im\{C_{-2}\} \end{bmatrix} = \beta \cdot \begin{bmatrix} +1 & -1 & -1 & +1 \\ +1 & -1 & +1 & -1 \\ -1 & -1 & +1 & +1 \\ -1 & -1 & -1 & -1 \end{bmatrix} \cdot \begin{bmatrix} K_{++}\sin(\varphi_- + \gamma) \\ K_{+-}\sin(\varphi_+ + \gamma) \\ K_{-+}\sin(\varphi_+ - \gamma) \\ K_{--}\sin(\varphi_- - \gamma) \end{bmatrix} \quad (108)$$

FIG. 14

$$\begin{bmatrix} K_{++}\cos(\varphi_- + \gamma) \\ K_{+-}\cos(\varphi_+ + \gamma) \\ K_{-+}\cos(\varphi_+ - \gamma) \\ K_{--}\cos(\varphi_- - \gamma) \end{bmatrix} = \frac{1}{4\beta} \cdot \begin{bmatrix} +1 & +1 & +1 & +1 \\ -1 & -1 & +1 & +1 \\ +1 & -1 & +1 & -1 \\ -1 & +1 & +1 & -1 \end{bmatrix} \cdot \begin{bmatrix} \Re\{C_{+1}\} \\ \Re\{C_{+2}\} \\ \Re\{C_{-1}\} \\ \Re\{C_{-2}\} \end{bmatrix} \quad (109)$$

$$\begin{bmatrix} K_{++}\sin(\varphi_- + \gamma) \\ K_{+-}\sin(\varphi_+ + \gamma) \\ K_{-+}\sin(\varphi_+ - \gamma) \\ K_{--}\sin(\varphi_- - \gamma) \end{bmatrix} = \frac{1}{4\beta} \cdot \begin{bmatrix} +1 & +1 & -1 & -1 \\ -1 & -1 & -1 & -1 \\ -1 & +1 & +1 & -1 \\ +1 & -1 & +1 & -1 \end{bmatrix} \cdot \begin{bmatrix} \Im\{C_{+1}\} \\ \Im\{C_{+2}\} \\ \Im\{C_{-1}\} \\ \Im\{C_{-2}\} \end{bmatrix} \quad (110)$$

FIG. 15

$$K_{++} = \frac{1}{4\beta}\sqrt{(\Re\{C_{+1}\}+\Re\{C_{+2}\}+\Re\{C_{-1}\}+\Re\{C_{-2}\})^2 + (\Im\{C_{+1}\}+\Im\{C_{+2}\}-\Im\{C_{-1}\}-\Im\{C_{-2}\})^2} \quad (111)$$

$$K_{--} = \frac{1}{4\beta}\sqrt{(-\Re\{C_{+1}\}-\Re\{C_{+2}\}+\Re\{C_{-1}\}+\Re\{C_{-2}\})^2 + (-\Im\{C_{+1}\}-\Im\{C_{+2}\}-\Im\{C_{-1}\}-\Im\{C_{-2}\})^2} \quad (112)$$

$$K_{-+} = \frac{1}{4\beta}\sqrt{(\Re\{C_{+1}\}-\Re\{C_{+2}\}+\Re\{C_{-1}\}-\Re\{C_{-2}\})^2 + (-\Im\{C_{+1}\}+\Im\{C_{+2}\}+\Im\{C_{-1}\}-\Im\{C_{-2}\})^2} \quad (113)$$

$$K_{+-} = \frac{1}{4\beta}\sqrt{(-\Re\{C_{+1}\}+\Re\{C_{+2}\}+\Re\{C_{-1}\}-\Re\{C_{-2}\})^2 + (\Im\{C_{+1}\}-\Im\{C_{+2}\}+\Im\{C_{-1}\}-\Im\{C_{-2}\})^2} \quad (114)$$

FIG. 16

$$\frac{K_{++}}{K_{-+}} = \frac{2+\varepsilon_a}{2-\varepsilon_a} \Rightarrow \quad \varepsilon_a = 2\cdot\frac{K_{++}-K_{-+}}{K_{++}+K_{-+}} \quad (115)$$

$$\frac{K_{+-}}{K_{--}} = \frac{2+\varepsilon_a}{2-\varepsilon_a} \Rightarrow \quad \varepsilon_a = 2\cdot\frac{K_{+-}-K_{--}}{K_{+-}+K_{--}} \quad (116)$$

$$\frac{K_{++}}{K_{+-}} = \frac{2+\varepsilon_b}{2-\varepsilon_b} \Rightarrow \quad \varepsilon_b = 2\cdot\frac{K_{++}-K_{+-}}{K_{++}+K_{+-}} \quad (117)$$

$$\frac{K_{-+}}{K_{--}} = \frac{2+\varepsilon_b}{2-\varepsilon_b} \Rightarrow \quad \varepsilon_b = 2\cdot\frac{K_{-+}-K_{--}}{K_{-+}+K_{--}} \quad (118)$$

FIG. 17

$$\varphi_{-} = \frac{1}{2}\left(\tan^{-1}\left(\frac{\Im\{C_{+1}\}+\Im\{C_{+2}\}-\Im\{C_{-1}\}-\Im\{C_{-2}\}}{\Re\{C_{+1}\}+\Re\{C_{+2}\}+\Re\{C_{-1}\}+\Re\{C_{-2}\}}\right) + \tan^{-1}\left(\frac{\Im\{C_{+1}\}-\Im\{C_{+2}\}+\Im\{C_{-1}\}-\Im\{C_{-2}\}}{-\Re\{C_{+1}\}+\Re\{C_{+2}\}+\Re\{C_{-1}\}-\Re\{C_{-2}\}}\right)\right) \quad 121$$

$$\varphi_{+} = \frac{1}{2}\left(\tan^{-1}\left(\frac{-\Im\{C_{+1}\}-\Im\{C_{+2}\}-\Im\{C_{-1}\}-\Im\{C_{-2}\}}{-\Re\{C_{+1}\}-\Re\{C_{+2}\}+\Re\{C_{-1}\}+\Re\{C_{-2}\}}\right) + \tan^{-1}\left(\frac{-\Im\{C_{+1}\}+\Im\{C_{+2}\}+\Im\{C_{-1}\}-\Im\{C_{-2}\}}{\Re\{C_{+1}\}-\Re\{C_{+2}\}+\Re\{C_{-1}\}-\Re\{C_{-2}\}}\right)\right) \quad 122$$

FIG. 18

$$\begin{bmatrix} \Re\{\hat{x}(t)\} \\ \Im\{\hat{x}(t)\} \end{bmatrix} = \begin{bmatrix} \Re\{a(t)\}\Re\{b(t)\} & -\Im\{a(t)\}\Re\{b(t)\} \\ \Re\{a(t)\}\Im\{b(t)\} & -\Im\{a(t)\}\Im\{b(t)\} \end{bmatrix}_{BB} \cdot \begin{bmatrix} \Re\{x(t)\} \\ \Im\{x(t)\} \end{bmatrix} = Q \cdot \begin{bmatrix} \Re\{x(t)\} \\ \Im\{x(t)\} \end{bmatrix}$$

$$Q^{-1} = \begin{bmatrix} Q_{11}^{-1} & Q_{12}^{-1} \\ Q_{21}^{-1} & Q_{22}^{-1} \end{bmatrix}$$

FIG. 20

$$Q = \frac{1}{2} \begin{bmatrix} \left(1+\frac{\varepsilon}{2}\right)\cdot\cos\left(\frac{\varphi}{2}\right) & \left(1-\frac{\varepsilon}{2}\right)\cdot\sin\left(\frac{\varphi}{2}\right) \\ \left(1+\frac{\varepsilon}{2}\right)\cdot\sin\left(\frac{\varphi}{2}\right) & \left(1-\frac{\varepsilon}{2}\right)\cdot\cos\left(\frac{\varphi}{2}\right) \end{bmatrix} \quad (125)$$

COMMON MULTIPLIER

MATRIX POSITION 11

$$Q^{-1} = \frac{2}{\left(1-\frac{\varepsilon^2}{4}\right)\left(\left(\cos\left(\frac{\varphi}{2}\right)\right)^2 - \left(\sin\left(\frac{\varphi}{2}\right)\right)^2\right)} \begin{bmatrix} \left(1-\frac{\varepsilon}{2}\right)\cdot\cos\left(\frac{\varphi}{2}\right) & -\left(1-\frac{\varepsilon}{2}\right)\cdot\sin\left(\frac{\varphi}{2}\right) \\ -\left(1+\frac{\varepsilon}{2}\right)\cdot\sin\left(\frac{\varphi}{2}\right) & \left(1+\frac{\varepsilon}{2}\right)\cdot\cos\left(\frac{\varphi}{2}\right) \end{bmatrix}$$

MATRIX POSITION 22

FIG. 22

$$Q = \frac{1}{2}\begin{bmatrix} \left(1+\frac{\varepsilon}{2}\right)\cdot\cos\left(\frac{\varphi}{2}\right) & \left(1+\frac{\varepsilon}{2}\right)\cdot\sin\left(\frac{\varphi}{2}\right) \\ \left(1-\frac{\varepsilon}{2}\right)\cdot\sin\left(\frac{\varphi}{2}\right) & \left(1-\frac{\varepsilon}{2}\right)\cdot\cos\left(\frac{\varphi}{2}\right) \end{bmatrix} \quad (127)$$

FIG. 23

$$Q^{-1} = \frac{2}{\left(1-\frac{\varepsilon^2}{4}\right)\left(\left(\cos\left(\frac{\varphi}{2}\right)\right)^2 - \left(\sin\left(\frac{\varphi}{2}\right)\right)^2\right)}\begin{bmatrix} \left(1-\frac{\varepsilon}{2}\right)\cdot\cos\left(\frac{\varphi}{2}\right) & -\left(1+\frac{\varepsilon}{2}\right)\cdot\sin\left(\frac{\varphi}{2}\right) \\ -\left(1-\frac{\varepsilon}{2}\right)\cdot\sin\left(\frac{\varphi}{2}\right) & \left(1+\frac{\varepsilon}{2}\right)\cdot\cos\left(\frac{\varphi}{2}\right) \end{bmatrix}$$

I/Q CALIBRATION OF TRANSMIT AND RECEIVE PATHS IN OFDM FDD COMMUNICATION SYSTEMS

BACKGROUND

1. Field

The present disclosure relates generally to wireless communication devices and, more specifically, to a method of estimating the I/Q gain mismatch and phase mismatch simultaneously in the transmit and receive paths of a radio transceiver of an OFDM FDD system.

2. Background

Transceivers for wireless communication systems that use quadrature amplitude modulation typically exhibit I/Q gain and phase mismatches. A data signal that is to be transmitted by a communication system employing quadrature modulation is first converted into an in-phase (I-phase) transmit component and a quadrature-phase (Q-phase) transmit component. Then in the analog radio transmitter, the I and Q components of the data signal are up-converted to a radio frequency (RF) band. An up-converted. I-phase RF signal is generated when the I-phase transmit component is mixed with an I-phase component of a local oscillator signal. Similarly, an up-converted. Q-phase RF signal is generated when the Q-phase transmit component is mixed with a Q-phase component of the local oscillator signal. The I-phase and Q-phase RF signals are then added to form a composite RF signal that is transmitted over an air interface. Phase and gain imbalances between I and Q branches of the transmitter are introduced when the I-phase and the Q-phase components of a local oscillator signal are not separated by exactly 90 degrees and when the amplitude of the up-converted. I-phase RF signal docs not exactly equal the amplitude of the up-converted. Q-phase RF signal. In a similar manner, phase and gain imbalances between I and Q branches of the analog radio receiver are introduced when the received RF composite signal is down-converted by mixing with the I-phase and Q-phase components of a local oscillator signal. The phase and gain imbalances between I and Q branches of the receiver occur when the I-phase and Q-phase components of a local oscillator signal in the receiver are not separated by exactly 90 degrees and when the amplitude of the down-converted I-phase signal does not exactly equal the amplitude of the down-converted Q-phase signal. The four impairments caused by the phase and gain imbalances in the transmitter and receiver cause interference between positive and negative side bands of the signal spectrum.

Some wireless communications systems that are based on orthogonal frequency-division multiplexing (OFDM) and time division duplexing (TDD) currently include functionality to estimate the I/Q gain and phase impairments in the transmitter and in the receiver. The existing methods of estimating I/Q mismatches, however, have various disadvantages. First, the existing methods are performed in two steps. The transmit path must be calibrated before the receive path can be calibrated. The transmit I/Q mismatches are estimated; then the transmit path is corrected; and finally the calibrated transmit path is used to provide a reference signal for estimating the I/Q mismatches of the receive path. Second, the existing methods require additional hardware that is not otherwise used in the regular transmission of data signals in current OFDM modern transceivers, such as those used for the WLAN and WiMax standards. Separate dedicated hardware is needed to estimate the mismatch in the transmit path. Typically this hardware is an RF envelope detector. After the I/Q mismatches in the transmit path are estimated using the dedicated hardware, the local oscillator and mixers in the receiver are used to estimate the I/Q mismatches in the receiver.

A method is sought for estimating the I/Q gain and phase impairments in both the transmitter and the receiver of an OFDM transceiver at one time. In addition, an apparatus is sought that can estimate the I/Q gain and phase impairments in both the transmitter and receiver of an OFDM transceiver without requiring significant hardware not otherwise used in the regular transmission of data signals.

SUMMARY

A method of simultaneously estimating the I/Q gain and phase mismatches in both the transmitter and receiver of an OFDM FDD communication system is performed using an RF loop-back path going from the output of the quadrature mixer of the transmit path to the input of the quadrature mixer of the receive path. The estimation method is performed without using dedicated hardware outside of the OFDM FDD RF transceiver and baseband modem, such as an external mixer or external envelope detector. Thus, the estimation method is performed without using hardware, other than a dedicated connection for the RF loop-back path, that is not otherwise used in the regular transmission of data signals. In some embodiments, even a dedicated loop-back path is not used when on-chip coupling relays the output of the transmit path to the receive path, for example through the substrate of the integrated circuit.

An OFDM transceiver operates in an estimation mode and in a correction mode. In the estimation mode, the transceiver generates an evaluation signal having a single sideband tone. An inverse Fast Fourier transform block transforms the reference signal into in-phase (I-phase) and quadrature-phase (Q-phase) Tx components. The transmit path of the transceiver performs IQ modulation on the I-phase and Q-phase components. The I-phase Tx component is mixed with an I-phase transmitter oscillator signal to generate an up-converted in-phase signal. The Q-phase Tx component is mixed with a Q-phase transmitter oscillator signal to generate an up-converted quadrature-phase signal. A composite RF signal is generated by adding the up-converted in-phase signal and the up-converted quadrature-phase signal. The composite RF signal is transmitted via the RF loop-back path to the receive path of the transceiver, where the receive path performs IQ demodulation. The composite RF signal is mixed with an I-phase receiver oscillator signal to generate a down-converted in-phase signal. The composite RF signal is also mixed with a Q-phase receiver oscillator signal to generate a down-converted quadrature-phase signal. A Fast Fourier transform block transforms the down-converted in-phase signal and the down-converted quadrature-phase signal into an evaluation signal with four sideband tones. Each sideband tone exhibits a characteristic, such as amplitude. The transceiver uses the amplitudes of the four sideband tones to calculate eight multiplication factors. The multiplication factors are determined such that when I and Q components of the transmit and receive paths are added to each other according to the multiplication factors, the amplitude of one of the sideband tones increases and the amplitude of the other three sideband tones decreases. Those multiplication factors that entirely eliminate the gain and phase mismatches of both the transmit and receive paths result in an evaluation signal having a single sideband tone with the amplitudes of three of the sideband tones being zero.

In the correction mode, the I/Q mismatches in data signals are corrected by pre-processing up-converted RF signals and post-processing down-converted RF signals. In one embodiment, the transceiver is comprised of a digital baseband integrated circuit (IC) and an analog RF transceiver IC. The digital baseband IC includes a first correction circuit between the inverse Fast Fourier transform block and digital-to-analog converters. The digital baseband IC also includes a second correction circuit between analog-to-digital converters and the Fast Fourier transform block. Each correction circuit includes four multipliers and two adders. Correction of the I/Q mismatches is performed by adding attenuated components of in-phase and quadrature-phase signals to each other. For example, the second correction circuit has first, second, third and fourth multipliers and first and second adders. The first multiplier receives a down-converted in-phase signal and generates a first attenuated component signal. The second multiplier receives a down-converted quadrature-phase signal and generates a second attenuated component signal. The third multiplier receives the down-converted in-phase signal and generates a third attenuated component signal. The fourth multiplier receives the down-converted quadrature-phase signal and generates a fourth attenuated component signal. The first adder generates an in-phase component signal by adding the second attenuated component signal to the first attenuated component signal. The second adder generates a quadrature-phase component signal by adding the third attenuated component signal to the fourth attenuated component signal.

A Fourier transform calculation circuit generates a baseband signal using the in-phase component signal and the quadrature-phase component signal. The multiplication factors used by the multipliers to generate the attenuated signals are calculated in the estimation mode based on the evaluation signal and are used in the correction mode to generate the in-phase component signal and the quadrature-phase component signal that are combined to generate the corrected baseband signal. The four impairments have been corrected from the corrected baseband signal. The multiplication factors used in the correction mode are those that would result in the amplitude of one sideband tone of the evaluation signal increasing and the amplitudes of the other three sideband tones of the evaluation signal decreasing.

In another embodiment, correction circuits do not pre-process signals to be up-converted and post-process signals that have been down-converted, but rather correct the I/Q impairments at their sources. In this embodiment, correction multipliers and correction shifters within the quadrature mixers compensate for the gain mismatches and phase mismatches introduced by the quadrature mixers.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

Like numerals indicate like components in the accompanying drawings of the various embodiments.

FIG. 3 is a diagram in the frequency domain showing a reference signal generated by the transceiver of FIG. 1;

FIG. 4 is a complex equation describing the I-phase and Q-phase components output by an inverse Fast Fourier transform (IFFT) block of the transceiver of FIG. 1;

FIG. 5 shows equations describing the output of in-phase and quadrature-phase transmit mixers of the transceiver of FIG. 1;

FIG. 6 is an equation describing an up-convened in-phase signal generated by mixing the I and Q components output by the IFFT block with the real part of the output of the in-phase transmit mixer of the transceiver of FIG. 1;

FIG. 7 shows equations describing the output of the receive mixers of the transceiver of FIG. 1 based solely on the local oscillator signals before mixing with the composite RF signal;

FIG. 8 shows equations describing the convolution of the output of the receive mixers with the characteristics of the RF loop-back path of the transceiver of FIG. 1;

FIG. 9 is an equation representing the baseband signal that results when the composite RF signal is mixed with the local oscillator signal of the receiver of the transceiver of FIG. 1;

FIG. 10 is a diagram in the frequency domain showing the magnitudes of the four complex frequency coefficients of the evaluation signal generated using the reference signal;

FIG. 11 is an equation representing the complex frequency coefficients of FIG. 10 as a function of the gain and phase mismatches of the transmitter and receiver and of the time delay of the RF loop-back path;

FIG. 12 shows equations describing the relationship between gain components and the gain mismatches;

FIG. 13 shows equations describing the relationship between the phase components and the phase mismatches;

FIG. 14 shows equations describing the real and imaginary parts of the complex amplitudes described in the equation of FIG. 11;

FIG. 15 shows equations representing the gain and phase components as a linear combination of the real and imaginary parts of the complex amplitudes described in the equation of FIG. 11;

FIG. 16 shows equations expressing the gain components in terms of the complex frequency coefficients that were measured from the evaluation signal 105;

FIG. 17 shows equations describing the gain impairment of the transmitter and the gain impairment of the receiver in terms of the gain components;

FIG. 18 shows equations expressing the phase components in terms of the complex frequency coefficients that were measured from the evaluation signal 105;

FIG. 19 is an equation representing the baseband components of a complex data signal after up-conversion and down-conversion.

FIG. 20 shows the coefficients of the inverse matrix that correspond to the multiplication factors of the multipliers in correction circuits of the transceiver of FIG. 1;

FIG. 21 is an equation expressing the coefficients of the Q matrix as a function of the gain and phase mismatches of the transmitter of the transceiver of FIG. 1;

FIG. 22 is an equation expressing the multiplication factors of the inverse matrix as a function of the gain and phase mismatches of the transmitter of the transceiver of FIG. 1;

FIG. 23 is an equation expressing the coefficients of the Q matrix as a function of the gain and phase mismatches of the receiver of the transceiver of FIG. 1;

FIG. 24 is an equation expressing the multiplication factors of the inverse matrix as a function of the gain and phase mismatches of the receiver of the transceiver of FIG. 1;

DETAILED DESCRIPTION

Reference will now be made in detail to the various embodiments, examples of which are illustrated in the accompanying drawings.

Figure 1:
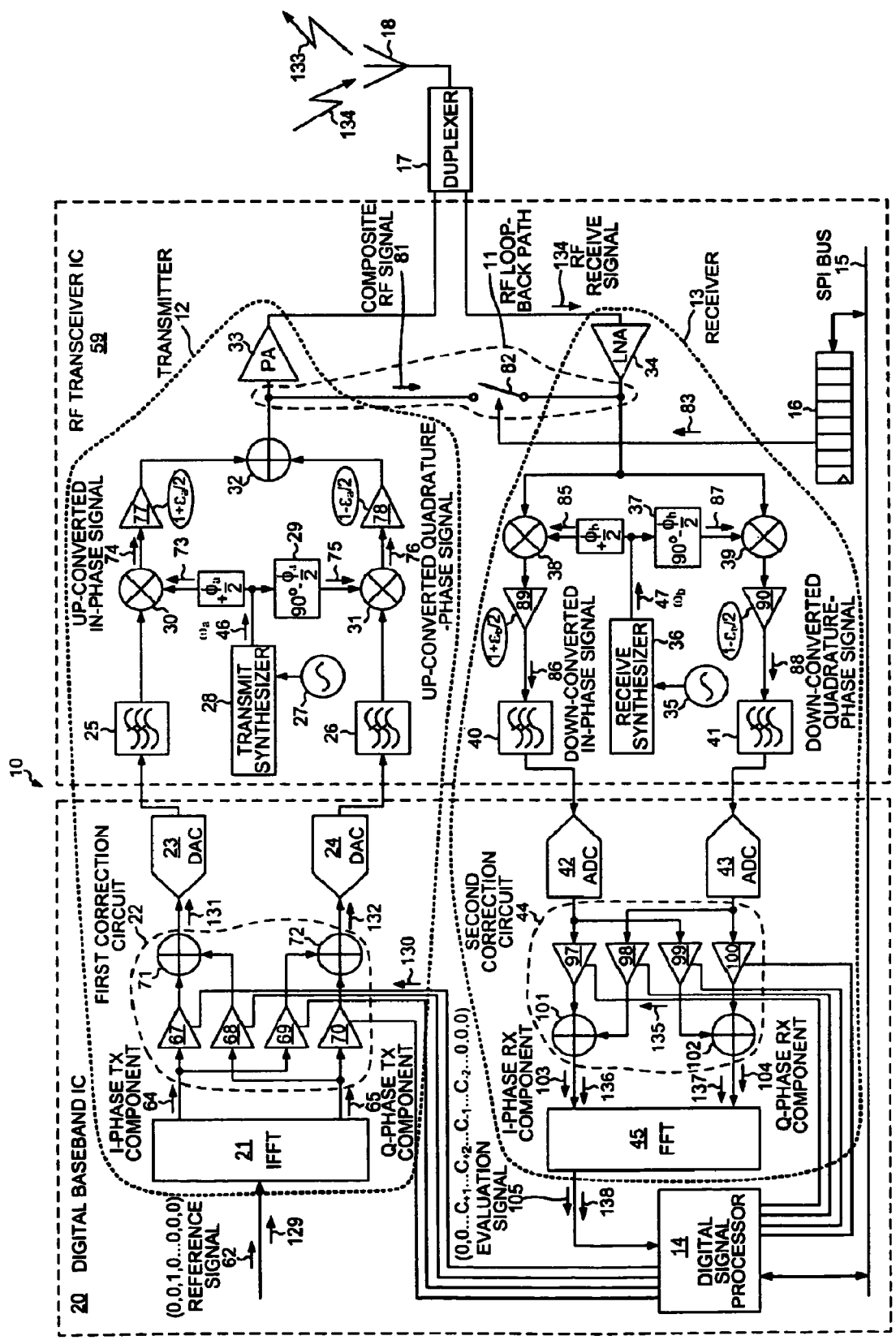
FIG. 1 is a simplified schematic block diagram of an OFDM transceiver that performs a method of simultaneously estimating the gain and phase mismatches of both the transmitter and the receiver.

FIG. 1 is a simplified block diagram of a transceiver 10 that performs IQ modulation and demodulation for a wireless communication system that is based on orthogonal frequency division multiplexing (OFDM) using frequency division duplexing (FDD). Transceiver 10 includes an RF loop-back path 11 from the quadrature mixer of the transmit path to the quadrature mixer of the receive path. RF loop-back path 11 is used to perform a method of simultaneously estimating the gain and phase mismatches in the in-phase and quadrature-phase paths of both the transmitter and the receiver. The I/Q calibration method is performed without using any additional hardware external to transceiver 10. The method of simultaneously estimating the I/Q gain and phase mismatches (impairments) in both the transmitter and receiver is particularly suited for FDD modern transceivers because these receivers independently generate the transmit and receive frequencies. Moreover, the method is particularly suited for OFDM modern transceivers because OFDM receivers include signal generation and processing devices capable of performing the I/Q mismatch estimation of the method. Thus, devices that operate under the following wireless communication standards can perform the method without significant additional hardware: 3GPP Long-Term Evolution (LTE), Ultra Mobile Broadband (UMB) also known as Evolution-Data Optimized Revision C, and FDD WiMax (IEEE 802.16). In one example, transceiver 10 is part of a mobile communication device, such as a cell phone or a personal digital assistant (PDA). In another example, transceiver 10 is part of a base station that receives signals from and transmits signals to mobile communication devices.

Transceiver 10 includes RF loop-back path 11, a transmitter 12, a receiver 13, a digital signal processor (DSP) 14, a serial peripheral interface (SPI) bus 15 and an I/Q calibration register 16. Transceiver 10 is coupled to a duplexer 17 and an antenna 18. Transmitter 12 performs IQ modulation based on OFDM, and receiver 13 performs IQ demodulation based on OFDM. In one embodiment, the functions of transmitter 12 and receiver 13 are performed on both an analog radio frequency (RF) transceiver integrated circuit (IC) 19 and on a digital baseband IC 20. RF transceiver IC 19 and digital baseband IC 20 communicate over SPI serial bus 15. I/Q calibration register 16 can be written to from SPI serial bus 15 and is used to control RF loop-back path 11. In some embodiments, SPI serial bus 15 is replaced with a parallel interface between RF transceiver IC 19 and digital baseband IC 20. Communication between IC 19 and IC 20 is faster over the parallel interface than over a single pin interface, such as SPI serial bus 15.

In another embodiment of transceiver 10 not shown in FIG. 1, both the analog and the digital functions of transceiver 10 are performed on a single integrated circuit, called a system on a chip (SOC). The system on a chip includes the quadrature mixers of the transmit and receive paths, as well as baseband processing and digital control blocks. The baseband processing block performs the calculations of the I/Q calibration method, and the digital control block controls the transmit and receive operations to correct for the I/Q gain and phase mismatches in the transmitter and receiver.

In the embodiment of FIG. 1, transmitter 12 includes an inverse Fast Fourier transform (IFFT) block 21, a first correction circuit 22, a first digital-to-analog converter (DAC) 23, a second DAC 24, a first low pass filter 25, a second low pass filter 26, a transmit local oscillator 27, a transmit frequency synthesizer 28, a transmit phase shifter 29, an in-phase transmit mixer 30, a quadrature-phase transmit mixer 31, a summer 32 and a power amplifier 33. Receiver 13 includes a low-noise amplifier 34, a receive local oscillator 35, a receive frequency synthesizer 36, a receive phase shifter 37, an in-phase receive mixer 38, a quadrature-phase receive mixer 39, a third low pass filter 40, a fourth low pass filter 41, a first analog-to-digital converter (ADC) 42, a second ADC 43, a second correction circuit 44 and a Fast Fourier transform (FFT) block 45. Digital baseband IC 20 tunes transmitter 12 and receiver 13 by controlling the frequency $\omega_a$ of a local oscillator (LO) signal 46 supplied by transmit frequency synthesizer 28 to mixers 30-31 and the frequency $\omega_b$ of a LO signal 47 supplied by receive frequency synthesizer 36 to mixers 38-39. Transmit local oscillator 27 generates an oscillating signal, and transmit frequency synthesizer 28 adjusts the oscillating signal to generate LO signal 46. Similarly, receive frequency synthesizer 36 conditions the oscillating signal output by receive local oscillator 35 to generate LO signal 47.

In the method of simultaneously estimating both receive and transmit I/Q mismatches, transceiver 10 uses the frequency offset between the transmitter and the receiver of the FDD communication system to decouple the determination of the transmitter I/Q mismatches from the determination of the receiver I/O mismatches and thereby renders determination of the four mismatches resolvable in one set of calculations. Transceiver 10 estimates both the I/Q gain and phase mismatches in the transmitter and the I/Q gain and phase mismatches in the receiver at the same time instead of first estimating the I/Q mismatches of the transmitter, then calibrating the transmit path, and then estimating the I/Q mismatches of the receiver.

Where the transmitter and the receiver use the same frequency, such as in time division duplexing (TDD) systems, the I/Q mismatches of the transmitter cannot be resolved separately from the I/Q mismatches of the receiver without using additional hardware. Thus. I/Q estimation methods for TDD systems use additional hardware to downconvert the RF transmit signal at a different frequency than that at which the receiver downconverts the RF transmit signal. Conventional I/Q estimation methods for both TDD and FDD systems have first calibrated the transmit path before estimating the I Q mismatches of the receive path. Because the method of simultaneously estimating both receive and transmit I Q mismatches performs the processing for all four I Q mismatch estimations at one time, the estimation method is at least twice as fast as conventional I Q estimation methods.

Figure 2:
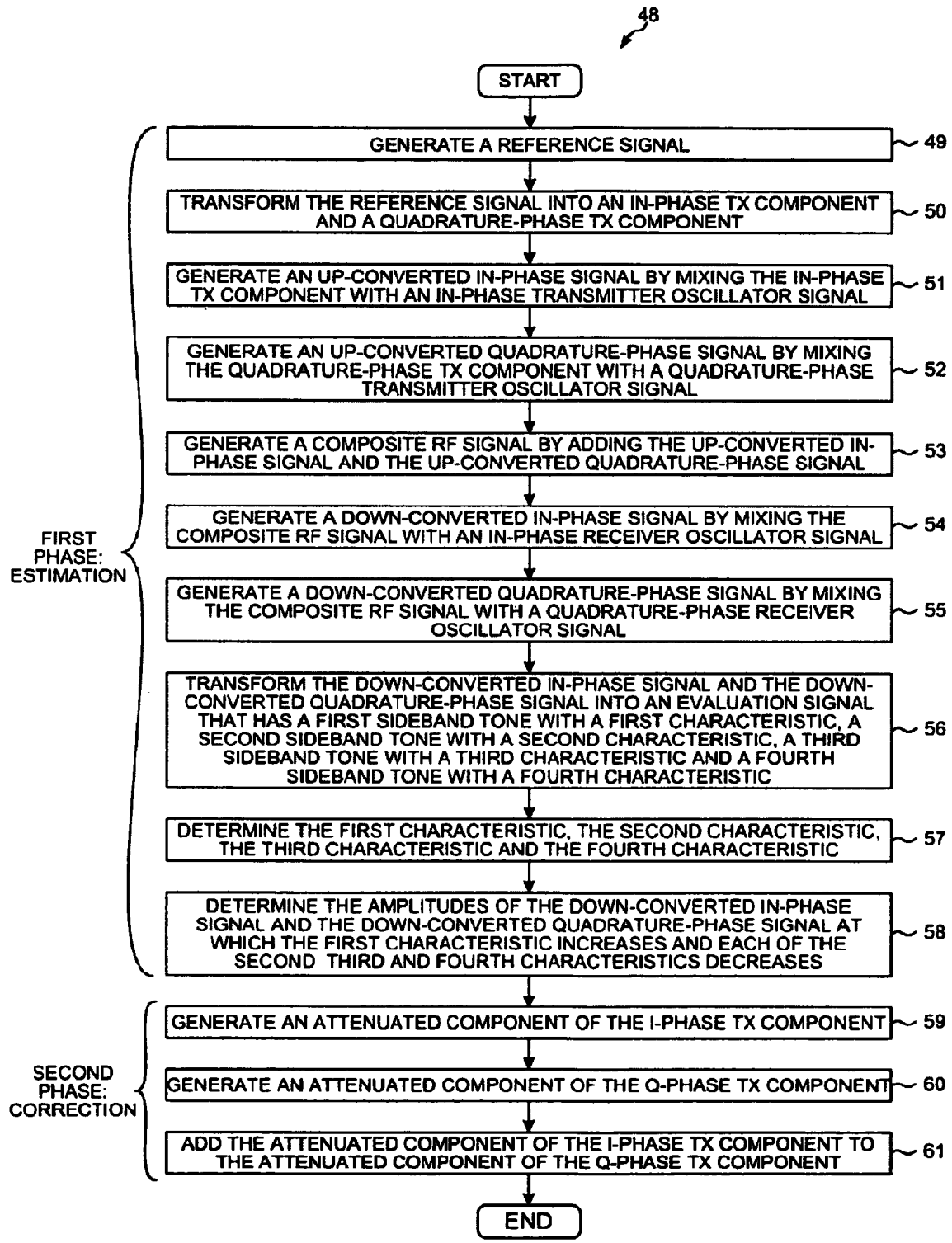
FIG. 2 is a flowchart of steps for estimating and correcting the gain and phase mismatches of the transceiver of FIG. 1.

FIG. 2 is a flowchart showing steps of a method 48 by which all four I/Q impairments of the transmit and receive paths of an OFDM transceiver are estimated at the same time and corrected. The operation of transceiver 10, as shown in FIG. 1, is explained in detail in connection with steps 49-61 listed in FIG. 2. Transceiver 10 operates in two modes: an estimation mode and a correction mode. The estimation mode corresponds to a first phase of method 48 in which the four I/Q impairments are estimated. The correction mode corresponds to a second phase of method 48 in which the four I/Q impairments are corrected using first correction circuit 22 and second correction circuit 44. In a first step 49, the method 48 of simultaneously estimating both receive and transmit I/Q mismatches uses resources in DSP 14 to generate a reference signal 62. Reference signal 62 is generated in the frequency domain and has a single sideband tone.

FIG. 3 is a diagram in the frequency domain showing the amplitudes of various "frequency bins" of reference signal 62. In one exemplary implementation, there are sixty-four frequency bins. FIG. 3 illustrates that reference signal 62 has an amplitude in only the frequency bin 63 at frequency $\omega_0$. The amplitudes of the frequency bins of reference signal 62 are represented in FIG. 1 as (0, 0, 1, 0 . . . 0, 0, 0). Thus, reference signal 62 has a single sideband tone at $\omega_0$.

In step 50, inverse Fast Fourier transform block 21 transforms reference signal 62 from the frequency domain into the time domain. IFFT 21 outputs the time domain transform of reference signal 62 in the form of a real I-phase Tx component 64 and an imaginary Q-phase Tx component 65. I-phase Tx component 64 can be represented as $\cos(\omega_0 t)$, and Q-phase Tx component 65 can be represented as $j\sin(\omega_0 t)$.

FIG. 4 is a complex equation 66 describing I-phase component 64 and Q-phase component 65 output by IFFT 21. Equation 66 described components 64 and 65 in the time domain as $x(t)$ in terms of $\omega_0$, where j is the imaginary unit.

I-phase Tx component 64 and Q-phase Tx component 65 are received by first correction circuit 22. First correction circuit 22 includes four multipliers 67-70 and two adders 71-72. I-phase Tx component 64 is received by first multiplier 67 and third multiplier 69, and Q-phase Tx component 65 is received by second multiplier 68 and fourth multiplier 70. First adder 71 receives the output of first multiplier 67 and second multiplier 68, while second adder 72 receives the output of third multiplier 69 and fourth multiplier 70. In the first phase of method 48 in which the four I/Q impairments are estimated and before the impairments are corrected, first correction circuit 22 merely passes on I-phase component 64 and Q-phase component 65 unchanged to digital-to-analog converters 23-24. In the first phase while transceiver 10 is operating in the estimation mode, the multiplication factors of second and third multipliers 68-69 are set to zero. First DAC 23 receives I-phase Tx component 64 and outputs an analog I-phase Tx component. Second DAC 24 receives Q-phase Tx component 65 and outputs an analog Q-phase Tx component. The analog Tx components are output by digital baseband IC 20 and received by analog RF transceiver IC 19. The analog I-phase Tx component is Filtered by first low pass filter 25, and the analog Q-phase Tx component is filtered by second low pass filter 26.

In a step 51, the converted and filtered I-phase Tx component is up-converted by mixing it with transmitter LO signal 46. Transmit frequency synthesizer 28 generates transmitter LO signal 46 with a frequency $\omega_a$ and provides in-phase transmitter LO signal 73 to in-phase transmit mixer 30. In-phase transmit mixer 30 generates an up-converted in-phase signal 74. In a step 52, the converted and filtered Q-phase Tx component is up-converted by quadrature-phase transmit mixer 31. Transmit phase shifter 29 receives transmitter LO signal 46, delays the phase by 90 degrees and outputs a quadrature-phase transmitter LO signal 75. Mixer 31 mixes quadrature-phase transmitter LO signal 75 with the converted and filtered Q-phase Tx component and outputs an up-converted quadrature-phase signal 76. In FIG. 1, transmit phase shifter 29 is depicted as shifting the phase of transmitter LO signal 46 by "$90°-\phi_a/2$". In addition, in-phase transmitter LO signal 73 is depicted as having a phase that is shifted "$+\phi_a/2$" from transmitter LO signal 46. The $\phi_a$ represents the phase impairment by which up-converted quadrature-phase signal 76 is not shifted exactly 90 degrees compared to up-converted in-phase signal 74. Similarly, a multiplier 77 that multiplies by "$1+\epsilon_a 2$" and a multiplier 78 that multiplies by "$1-\epsilon_a 2$" represent the gain mismatch between the in-phase and quadrature-phase paths of the transmitter. The $\epsilon_a$ represents the gain impairment by which the amplitude of up-converted in-phase signal 74 is greater than the amplitude of up-converted quadrature-phase signal 76.

FIG. 5 shows an equation 79 describing the output of in-phase transmit mixer 30 based solely on in-phase transmitter LO signal 73 and before mixing with the converted and filtered I-phase Tx component obtained from the real I-phase Tx component 64. FIG. 5 also shows an equation 80 describing the output of quadrature-phase transmit mixer 31 based solely on quadrature-phase transmitter LO signal 75 and before mixing with the converted and filtered Q-phase Tx component obtained from the imaginary Q-phase Tx component 65. Equation 79 describes the real part and equation 80 describes the imaginary part of the output of the transmit mixers as a function of the frequency $\omega_a$ of transmitter LO signal 46, the phase mismatch $\phi_a$ and the gain mismatch $\epsilon_a$.

In a step 53, summer 32 adds up-converted in-phase signal 74 and up-converted quadrature-phase signal 76 and outputs a composite RF signal 81. In the estimation mode, no signals are conveyed through antenna duplexer 17 and transmitted by antenna 18. In the estimation mode, composite RF signal 81 is conveyed via RF loop-back path 11 from the quadrature mixer of transmitter 12 to the quadrature mixer of receiver 13. In the first phase of method 48, a switch 82 in RF loop-back path 11 is closed. In the second phase of method 48, switch 82 is open. In one embodiment, switch 82 is comprised of two transistors. Switch 82 is closed when a switching signal 83 is asserted. In one embodiment, switching signal 83 is asserted when a digital one is written into the sixth bit of I/Q calibration register 16. Digital baseband IC 20 controls switch 82 by communicating across SPI serial bus 15 and writing the digital one into the sixth bit of I/Q calibration register 16.

In another embodiment, no dedicated loop-back path is used to convey composite RF signal 81 from the quadrature mixer of transmitter 12 to the quadrature mixer of receiver 13. Instead, the substrate of IC 19 and IC 20 or the substrate of the system on a chip (SOC) acts as the RF loop-back path, and composite RF signal 81 is conveyed between the transmitter and receiver through substrate coupling. Alternatively, coupling of signals from transmitter 12 to receiver 13 can be performed through transformers. In yet another embodiment, an off-chip coupler is used to convey composite RF signal 81 from the quadrature mixer of transmitter 12 to the quadrature mixer of receiver 13.

FIG. 6 shows an equation 84 describing the up-converted output of the quadrature mixer of transmitter 12. Equation 84 describes both up-converted in-phase signal 74 and up-converted quadrature-phase signal 76. Up-converted in-phase signal 74 is the product of equation 66 describing the I and Q components 64-65 output by IFFT 21 multiplied by equation 79 describing the real part of the output of in-phase transmit mixer 30 generated with in-phase transmitter LO signal 73. Up-converted quadrature-phase signal 76 is the product of equation 66 describing the I and Q components 64-65 multiplied by equation 80 describing the imaginary part of the output of quadrature-phase transmit mixer 31 generated with quadrature-phase transmitter LO signal 75. Equation 84 describes up-converted signal 74 and 76 as the function $\Re\{x(t) \cdot a(t)\}$ of the frequency $\omega_0$ of the single sideband tone of reference signal 62, the frequency $\omega_a$ of transmitter LO signal 46, the transmit phase mismatch $\phi_a$ and the transmit gain mismatch $\epsilon_a$.

In a step 54, composite RF signal 81 is down-converted by mixing it with receiver LO signal 47. Receive frequency synthesizer 36 generates receiver LO signal 47 having a frequency $\omega_b$ and provides an in-phase receiver LO signal 85 to in-phase receive mixer 38. In-phase receive mixer 38 generates a down-converted in-phase signal 86. In a step 55, composite RF signal 81 is also down-converted by mixing it with a quadrature-phase receive LO signal 87. Receive phase shifter 37 receives receiver LO signal 47, delays the phase by 90 degrees and outputs quadrature-phase receive LO signal 87. Mixer 39 mixes quadrature-phase receive LO signal 87 with composite RF signal 81 and outputs a down-converted quadrature-phase signal 88. In FIG. 1, receive phase shifter 37 is depicted as shifting the phase of receiver LO signal 47 by "$90°-\phi_b/2$". In addition, in-phase receive LO signal 85 is depicted as having a phase that is shifted "$+\phi_b/2$" from receiver LO signal 47. The $\phi_b$ represents the phase impairment by which down-converted quadrature-phase signal 88 is not shifted exactly 90 degrees compared to down-converted in-phase signal 86. Similarly, a multiplier 89 that multiplies by "$1+\epsilon_b/2$" and a multiplier 90 that multiplies by "$1-\epsilon_b/2$" represent the gain mismatch between the in-phase and quadrature-phase paths of the receiver. The $\epsilon_b$ represents the gain impairment by which the amplitude of down-converted in-phase signal 86 is greater than the amplitude of down-converted quadrature-phase signal 88.

FIG. 7 shows an equation 91 describing the output of in-phase receive mixer 38 based solely on in-phase receiver LO signal 85 and before mixing with composite RF signal 81. FIG. 7 also shows an equation 92 describing the output of quadrature-phase receive mixer 39 based solely on quadrature-phase receiver LO signal 87 and before mixing with composite RF signal 81. Equation 91 describes the real part and equation 92 describes the imaginary part of the output of the quadrature mixer of receiver 13 as a function of the frequency $\omega_b$ of receiver LO signal 47, the phase mismatch $\phi_b$ and the gain mismatch $\epsilon_b$.

When characterizing composite RF signal 81 that is down-converted in the quadrature mixer of receiver 13 for purposes of estimating I/Q mismatches, a more accurate estimation is obtained by considering the attenuation and delay in composite RF signal 81 introduced by RF loop-back path 11. RF loop-back path 11 introduces unknown gain, phase and delay errors. The RF loop-back path 11 causes gain scaling and a time delay across the channel connection from transmitter 12 to receiver 13. The characteristics of the channel connection are described by the equation:

$$c(t)=\beta \cdot \delta(t-\tau) \quad (93)$$

where $\beta$ represents the gain scaling, $\delta$ represents the phase shift, and $\tau$ represents the time delay. The function $\delta(t)$ denotes the Dirac impulse. In order more accurately to describe down-converted in-phase signal 86 and down-converted quadrature-phase signal 88, the output of the receive mixers 38-39 is first convolved with the characteristics of the channel connection before the product of composite RF signal 81 and receiver LO signal 47 is calculated.

FIG. 8 shows equations 94-95 that describe the convolution of the output of the receive mixers 38-39 with the characteristics of RF loop-back path 11. Equation 94 shows $\Re\{c(t)*b(t)\}$ and represents the convolution of equation 93 with the real part of the output of the quadrature mixer of receiver 13 described by equation 91. Equation 95 shows $\Im\{c(t)*b(t)\}$ and represents the convolution of equation 93 with the imaginary part described in equation 92.

FIG. 9 shows an equation 96 representing the baseband signal that results when composite RF signal 81 is mixed with receiver LO signal 47 and down-converted. Equation 96 is the product of $\Re\{x(t)\cdot a(t)\}$ (equation 84 representing the real part of the up-converted in-phase signal 74) and $\{c(t)\cdot b(t)\}$ (equations 94-95 representing the real and imaginary parts of the convolution of the receive mixers 38-39 with RF loop-back path 11). Thus, equation 96 is the product $\Re\{x(t)\cdot a(t)\}\cdot\{b(t)\cdot c(t)\}$. In order to simplify the calculation of the I Q mismatches, equation 96 considers only the product of up-converted in-phase signal 74 and the convolution of the characteristics of mixers 38-39 with RF loop-back path 11 that falls within a baseband bandwidth. Signal components of the multiplication of equation 84 and equations 94-95 that fall at the frequency $(\omega_a+\omega_b)$ are ignored because the frequency $(\omega_a+\omega_b)$ is roughly twice the carrier frequency of composite RF signal 21 and are assumed to be filtered out by third low pass filter 40 and fourth low pass filter 41.

Down-converted in-phase signal 86 is filtered by third low pass filter 40, and down-converted quadrature-phase signal 88 is filtered by fourth low pass filter 41. RF transceiver IC 19 then passes the filtered down-converted signals 86 and 88 to digital baseband IC 20. First analog-to-digital converter (ADC) 42 digitizes the filtered down-converted in-phase signal 86, and second ADC 43 digitizes the filtered down-converted quadrature-phase signal 88.

The digitized and filtered down-converted signals 86 and 88 are received by second correction circuit 44. Second correction circuit 44 includes four multipliers 97-100 and two adders 101-102. Digitized and filtered in-phase signal 86 is received by fifth multiplier 97 and seventh multiplier 99, and digitized and filtered quadrature-phase signal 88 is received by sixth multiplier 98 and eighth multiplier 100. Third adder 101 receives the output of fifth multiplier 97 and sixth multiplier 98, while fourth adder 102 receives the output of seventh multiplier 99 and eighth multiplier 100. In the first phase of method 48 in which the four I/Q mismatches are estimated and before the mismatches are corrected, second correction circuit 44 merely passes on digitized and filtered in-phase signal 86 and digitized and filtered quadrature-phase signal 88 unchanged to Fast Fourier transform (FFT) block 45. In the first phase while transceiver 10 is operating in the estimation mode, the multiplication factors of sixth and seventh multipliers 98-99 are set to zero. In the estimation mode, second correction circuit 44 outputs an I-phase Rx component 103 in substantially the same form as the digitized and filtered in-phase signal 86 that second correction circuit 44 receives from ADC 42. In the estimation mode, second correction circuit 44 outputs a Q-phase Rx component 104 in substantially the same form as the digitized and filtered quadrature-phase signal 88 that second correction circuit 44 receives from ADC 43.

In a step 56, FFT block 45 receives the digitized and filtered down-converted signals 86 and 88 and transforms them into an evaluation signal 105. Down-converted in-phase signal 86 and down-converted quadrature-phase signal 88 are received in the time domain by FFT block 45, and FFT block 45 outputs evaluation signal 105 in the frequency domain. Whereas reference signal 62 has a single sideband tone, evaluation signal 105 has four sideband tones. Each of the four sideband tones exhibits an amplitude, a phase and other characteristics. The characteristics of the sideband tones are represented by the complex frequency coefficients $C_{+1}$, $C_{+2}$, $C_{-1}$ and $C_{-2}$ that correspond to the various frequency bins (0, $0 \ldots C_{+1} \ldots C_{+2} \ldots C_{-1} \ldots C_{-2} \ldots 0, 0, 0$) indicated in FIG. 1. Assuming that $\omega_a > \omega_b$ and $\omega_0 < (\omega_a - \omega_b)$, then the four sideband tones with the characteristics in the magnitudes defined by the complex Fourier coefficients $C_{+1}, C_{+2}, C_{-1}$ and $C_{-2}$ fall at the frequencies $(\omega_a - \omega_b + \omega_0)$, $(\omega_a - \omega_b - \omega_0)$ $-(\omega_a - \omega_b + \omega_0)$ and $-(\omega_a - \omega_b - \omega_0)$, respectively.

FIG. 10 is a diagram of evaluation signal 105 in the frequency domain showing the magnitudes of the complex frequency coefficients $C_{-1}, C_{-2}, C_{-1}$ and $C_{-2}$ at the four corresponding frequency bins. In the estimation mode, the magnitudes of the complex frequency coefficients are determined by measuring evaluation signal 105.

In a step 57, DSP 14 determines the first characteristic $C_{-1}$ of the first sideband tone, the second characteristic $C_{-2}$ of the second sideband tone, the third characteristic $C_{-1}$ of the third sideband tone and the fourth characteristic $C_{-2}$ of the fourth sideband tone. The method 48 of estimating all four I/Q impairments at the same time uses the complex amplitudes $C_{-1}, C_{-2}, C_{-1}$ and $C_{-2}$ of the sidebands of evaluation signal 105 to calculate the multiplication factors for the eight multipliers of correction circuits 22 and 44. The multiplication factors correspond to the amplitudes of the I-phase and Q-phase inputs to correction circuits 22 and 44 that can be added to each other such that one of the complex amplitudes $C_{-1}, C_{-2}, C_{-1}$ and $C_{-2}$ increases and the other three complex amplitudes decrease. The increase of one complex amplitude and the decrease of the other three complex amplitudes corresponds to a reduction in the four I/Q impairments.

FIG. 11 shows an equation 106 representing the magnitude of complex frequency coefficients $C_{-1}, C_{-2}, C_{-1}$ and $C_{-2}$ as a function of the gain and phase mismatches $\epsilon_a$ and $\phi_a$ of transmitter 12, the gain and phase mismatches $\epsilon_b$ and $\phi_b$ of receiver 13 and the time delay $\tau$ of RF loop-back path 11. The determination of the multiplication factors for the eight multipliers of correction circuits 22 and 44 is performed in several calculations using the observed complex amplitudes $C_{-1}, C_{-2}, C_{-1}$ and $C_{-2}$ of the sidebands of evaluation signal 105. First, equation 106 is rewritten in terms of gain components $K_{11}$, $K_1$, and $K_1$ and $K$ and phase components $\phi_+$ and $\phi_-$. Moreover, the time delay t is expressed in terms of $\gamma$, where $\gamma = \omega_b \cdot \tau$. FIG. 12 shows equations describing the relationship between the gain components $K_{++}, K_{+-}, K_{-+}$ and $K_{--}$ and the gain mismatches $\epsilon_a$ and $\epsilon_b$. FIG. 13 shows equations describing the relationship between the phase components $\phi_+$ and $\phi_-$ and phase mismatches $\phi_a$ and $\phi_b$.

Then, the complex amplitudes described in equation 106 are divided into their real and imaginary parts. FIG. 14 shows an equation 107 describing the real pan of the complex amplitudes of equation 106. FIG. 14 also shows an equation 108 describing the imaginary part of the complex amplitudes of equation 106. Equation 107 is then rewritten to express the gain components $K_1, K_{111}, K_1$ and $K_1$ and phase components $\phi_1$ and $\phi_1$ as a linear combination of the real part of the complex amplitudes $C_{-1}, C_{-2}, C_{-1}$ and $C_{-2}$. FIG. 15 shows an equation 109 representing the gain and phase components as a linear combination of the real pan of the complex amplitudes. FIG. 15 also shows an equation 110 representing the gain and phase components as a linear combination of the imaginary part of the complex amplitudes.

The equations 109 and 110 are then used to solve for the gain components $K_1, K_1, K_1$ and $K_1$. The gain component of each row of equations 109 and 110 is calculated as $K = (\Re \, \text{row}|^2 + \Im \, \text{row}|^2)^{1/2}$. FIG. 16 shows equations 111-114 that express the gain components $K_1, K_1, K_1$ and $K_1$ in terms of the complex frequency coefficients $C_{11}, C_{12}, C_{11}$ and $C_{12}$ that were measured from evaluation signal 105. The values of the gain components are calculated using the measured values of the complex frequency coefficients.

Next, the gain impairment $\epsilon_a$ of the quadrature mixer of transmitter 12 and the gain impairment $\epsilon_b$ of the quadrature mixer of receiver 13 are determined by solving the equations of FIG. 12 for $\epsilon_a$ and $\epsilon_b$ and inserting the values obtained from equations 111-114 for the gain components $K_1, K_1, K_1$ and $K_1$. The gain components $K_1, K_1, K_1$, and $K_1$ were expressed in equations 111-114 in terms of the complex amplitudes $C_{11}, C_{12}, C_{11}$ and $C_{12}$. Thus, the gain impairments $\epsilon_a$ and $\epsilon_b$ are determined from the observed complex amplitudes $C_{+1}, C_{+2}, C_{-1}$ and $C_{-2}$.

FIG. 17 shows two equations 115-116 that express the gain impairment $\epsilon_a$ in terms of the gain components $K_{++}, K_{+-}, K_{-+}$ and $K_{-1}$. The results of the two equations 115-116 will likely not be identical because of noise introduced by transceiver 10. Thus, the two values of the gain impairment $\epsilon_a$ in transmitter 12 are determined using both equations, and the results are averaged. FIG. 17 also shows two equations 117-118 that express the gain impairment $\epsilon_b$ in receiver 13 in terms of the gain components $K_{++}, K_{+-}, K_{-+}$ and $K_{--}$. The results of the two equations 117-118 are also averaged to obtain the gain impairment $\epsilon_b$. Note that the values for $\epsilon_a$ and $\epsilon_b$ in equations 115-118 are no longer dependent on the gain of the channel connection represented by the gain scaling factor $\beta$, which is present in equations 111-114.

Next, the phase mismatch $\phi_a$ of the quadrature mixer of transmitter 12 and the phase mismatch $\phi_b$ of the quadrature mixer of receiver 13 are determined. Using the equations of FIG. 13, the phase mismatches $\phi_a$ and $\phi_b$ are expressed in terms of the phase components $\phi_1$ and $\phi_1$ as follows:

$$\phi_a = \phi_1 + \phi_1 \qquad (119)$$

$$\phi_a = \phi_1 - \phi_1 \qquad (120).$$

Then, the phase components $\phi_1$ and $\phi_1$ are extracted from equations 109 and 110 of FIG. 15. Each of the four rows of equation 110 is divided by the corresponding row of equation 109. The phase is then extracted by applying $\tan^{-1}$. Then, the rotation introduced by the channel connection is removed by adding rows one and four and rows two and three. FIG. 18 shows equations 121 and 122 that express the phase components $\phi_1$ and $\phi_1$ in terms of the complex frequency coefficients $C_{11}, C_{12}, C_{11}$ and $C_{12}$. Thus, the phase mismatches $\phi_a$ and $\phi_b$ are determined from the observed complex amplitudes $C_{11}$, $C_{12}, C_{11}$ and $C_{12}$.

In the last step of the first phase of method 48 and while transceiver 10 is still operating in the estimation mode, the multiplication factors to be used in the second phase are determined. Then in the second phase of method 48 while transceiver 10 is operating in the correction mode, the multipliers 67-70 and 97-100 are set using the multiplication factors in order to correct for the four I/Q impairments (gain impairments $\epsilon_a$ and $\epsilon_b$ and phase mismatches $\phi_a$ and $\phi_b$).

In a step 58, the amplitudes of I-phase Tx component 64 and Q-phase Tx component 65 that are added to each other to correct for the gain and phase impairments $\epsilon_a$ and $\phi_a$ are determined. For example, an amplitude of I-phase Tx component 64 as governed by the multiplication factor of multiplier 67 and an amplitude of Q-phase Tx component 65 as governed by the multiplication factor of multiplier 68 are added such that two of the frequency coefficients ($C_{+1}$ and $C_{-1}$) increase and the other two coefficients ($C_{+2}$ and $C_{-2}$) decrease. (The correction of the gain and phase impairments $\epsilon_b$ and $\phi_b$ of the receive path then also causes the frequency coefficient $C_{+1}$ to decrease.) The increase in a frequency coefficient represents an increase in a characteristic of the corresponding sideband tone of evaluation signal 105, such as the amplitude of the sideband tone. Also in step 58, the amplitudes of the digitized and filtered down-converted in-phase signal 86 and down-converted quadrature-phase signal 88 are determined at which a characteristic of one sideband tone increases and that characteristic of the other three sideband tones decreases, as represented by the frequency coefficients $C_{11}$, $C_{12}$, $C_{11}$ and $C_{12}$ of the four sideband tones. For an implementation in which reference signal 62 has the single sideband tone at the particular frequency bin (0, 0, 1, 0 ... 0, 0, 0) that results in evaluation signal 105 having the sideband tones at the various frequency bins (0, 0 ... $C_{11}$ ... $C_{12}$ ... $C_{11}$ ... $C_{12}$ ... 0, 0, 0), the frequency coefficient that increases is $C_{11}$. In other implementations in which different frequency bins are used, the frequency coefficient that increases is $C_{12}$.

The multiplication factors for multipliers 67-70 and 97-100 are calculated by assuming a unity matrix Q that results in ideal up-conversion and down-conversion. A complex data signal that is transmitted and received by transceiver 10 is expressed as:

$$x(t) = [\Re|x(t) \cdot a(t)| \cdot b(t)]_{BB} \quad (123).$$

Equation 123 is rewritten by separating the real and imaginary components and including the unity matrix Q. FIG. 19 shows the resulting rewritten equation 124 representing the baseband components of a complex data signal after up-conversion by a(t) and down-conversion by b(t), where $\omega_a = \omega_b$. Because multiplication by the unity matrix Q results in ideal up-conversion and down-conversion, multiplication by the inverse of the actual matrix Q ($Q^{1-1}$) will result in the unity matrix and compensate for any I/Q gain and phase mismatches. Thus, correction of the I/Q impairments is achieved by multiplying the data signal by the multiplication factors corresponding to the gain coefficients of the inverse matrix $Q^{-1}$. FIG. 20 shows the coefficients of the inverse matrix $Q^{-1}$ that correspond to the multiplication factors of the multipliers 67-70 and 97-100.

To determine the multiplication factors for multipliers 67-70 that are used to correct for the I/Q gain and phase mismatches of the quadrature mixer of transmitter 12, the quadrature mixer of receiver 13 is assumed to be ideal with impairments $\epsilon_b = \phi_b = 0$. Then Q is solved for in equation 124 and the values of $\Re\{a(t)\}$ and $\Im\{b(t)\}$ are inserted from equations 79 and 80 and the values of $\Re\{b(t)\}$ and $\Im\{b(t)\}$ are inserted from equations 91 and 92. To determine the multiplication factors for multipliers 97-100 that are used to correct for the I/Q gain and phase mismatches of the quadrature mixer of receiver 13, the impairments of transmitter 12 are set to zero, i.e., $\epsilon_a = \phi_a = 0$. Thus, when $\epsilon_b = \phi_b = 0$ and the gain impairment $\epsilon_a$ and the phase mismatch $\phi_a$ are used in the calculation, the first multiplication factor of multiplier 67 is the coefficient at matrix position 11 of FIG. 20; the second multiplication factor of multiplier 68 is the coefficient at matrix position 12; the third multiplication factor of multiplier 69 is the coefficient at matrix position 21; and the fourth multiplication factor of multiplier 70 is the coefficient at matrix position 22. When $\epsilon_a = \phi_a = 0$ and the gain impairment $\epsilon_b$ and the phase mismatch $\phi_b$ are used in the calculation, the fifth multiplication factor of multiplier 97 is the coefficient at matrix position 11; the sixth multiplication factor of multiplier 98 is the coefficient at matrix position 12; the seventh multiplication factor of multiplier 99 is the coefficient at matrix position 21; and the eighth multiplication factor of multiplier 100 is the coefficient at matrix position 22.

When $\epsilon_b = \phi_b = 0$ and the gain impairment $\epsilon_a$ and the phase mismatch $\phi_a$ are used in the calculation, solving for Q in equation 124 results in equation 125 of FIG. 21. The inverse of Q is then calculated to arrive at the gain coefficients used by first correction circuit 22 to correct for the gain and phase impairments of transmitter 12. FIG. 22 shows an equation 126 that describes the multiplication factors of the four multipliers 67-70. For example, to determine the first multiplication factor for multiplier 67, the common multiplier of equation 126 is multiplied by the matrix position 11, which equals $(1 - \epsilon_a/2) \cdot \cos(\phi_a/2)$.

To determine the multiplication factors for multipliers 97-100 that are used to correct for the I/Q gain and phase mismatches of the quadrature mixer of receiver 13, the quadrature mixer of transmitter 12 is assumed to be ideal with impairments $\epsilon_a = \phi_a = 0$. Then, as for the transmitter correction factors, Q is solved for in equation 124 and the values of $\Re\{a(t)\}$, $\Im\{a(t)\}$, $\Re\{b(t)\}$ and $\Im\{b(t)\}$ are inserted from equations 79, 80, 91 and 92.

When $\epsilon_a = \phi_a = 0$ and the gain impairment $\epsilon_b$ and the phase mismatch $\phi_b$ are used in the calculation, solving for Q in equation 124 results in equation 127 of FIG. 23. The inverse of Q is then calculated to arrive at the gain coefficients used by second correction circuit 44 to correct for the gain and phase impairments of receiver 13. FIG. 24 shows an equation 128 that describes the multiplication factors of the four multipliers 97-100. For example, to determine the sixth multiplication factor for multiplier 98, the common multiplier of equation 128 is multiplied by the matrix position 12, which equals $-(1 + \epsilon_b/2) \cdot \sin(\phi_b/2)$.

In summary, in the first phase of method 48 when transceiver 10 operates in the estimation mode, reference signal 62 is generated and evaluation signal 105 is observed. The complex frequency coefficients $C_{11}$, $C_{12}$, $C_{11}$ and $C_{12}$ are determined by measuring evaluation signal 105. In a series of calculations performed in DSP 14, gain components $K_1$, $K_1$, $K_1$, and $K_{1--}$ and phase components $\phi_1$ and $\phi_{1-}$ are calculated. Using the gain components and the phase components, all four I/Q impairments (gain impairments $\epsilon_a$ and $\epsilon_b$ and phase mismatches $\phi_a$ and $\phi_b$) are determined at one time based on a single reference signal. The four impairments are used to calculate eight multiplication factors used in the second phase of method 48 when transceiver is operating in the correction mode. The first four multiplication factors are used by the multipliers of first correction circuit 22 to correction the gain impairment $\epsilon_a$ and phase impairment $\phi_a$ of transmitter 12, and the second four multiplication factors are used by the multipliers of second correction circuit 44 to correction the gain impairment $\epsilon_b$ and phase impairment $\phi_b$ of receiver 13.

When data signals are transmitted in the correction mode, the I Q impairments are corrected by pre-processing the data signals with first correction circuit 22 to correct the gain and phase impairments of transmitter 12 and by post-processing the data signals received with second correction circuit 44 to correct for the gain and phase impairments of receiver 13. For example, pre-processing is performed after inverse Fourier transform calculation circuit 21 receives a data signal 129 containing information transmitted by a user of the OFDM communication system. IFFT 21 generates I-phase Tx component 64 and Q-phase Tx component 65. I-phase Tx component 64 is received by first multiplier 67 and third multiplier 69, and Q-phase Tx component 65 is received by second multiplier 68 and fourth multiplier 70. In the second phase of method 48 in which the four I/Q impairments are corrected, first correction circuit 22 does not merely passes through I-phase component 64 and Q-phase component 65 unchanged. Instead, the multiplication factors calculated in the estimation mode determine how much of each of components 64 and 65 will be added to the other component.

In a step 59, an attenuated component of I-phase Tx component 64 is generated using the first multiplication factor. DSP 14 sends a digital control signal 130 to multiplier 67. Multiplier 67 attenuates the amplitude of I-phase Tx component 64 by an amount corresponding to the first multiplication factor. In one embodiment, all of the multiplication factors cause the multipliers to attenuate the components 64 and 65. In another embodiment, the multiplication factors cause the multipliers either to amplify or to attenuate the components 64 and 65.

In a step 60, an attenuated component of Q-phase Tx component 65 is generated when multiplier 68 attenuates the amplitude of Q-phase Tx component 65 by an amount corresponding to the second multiplication factor.

In a step 61, the attenuated component of I-phase Tx component 64 is added to the attenuated component of Q-phase Tx component 65. First adder 71 receives the outputs of first multiplier 67 and second multiplier 68 and generates a corrected I-phase Tx component 131.

In addition, multiplier 69 attenuates I-phase Tx component 64 by an amount corresponding to the third multiplication factor, and multiplier 70 attenuates Q-phase Tx component 65 by an amount corresponding to the fourth multiplication factor. Second adder 72 receives the outputs of third multiplier 69 and fourth multiplier 70 and generates a corrected Q-phase Tx component 132. By adding a small amount of the quadrature phase component to the in-phase component and vice versa, both the phase and the amplitude of each component is modified and thereby corrected. The data signal 129 is first pre-processed to compensate for the I/Q gain and phase impairments that are later introduced by the transmit quadrature mixer and is then up-converted and transmitted as corrected transmission signal 133.

The correction mode also involves post-processing down-converted received signals to compensate for the I/Q gain and phase impairments that were introduced by the receive quadrature mixer. Second correction circuit 44 corrects received RF composite signals to compensate for the I/Q mismatches of the quadrature mixer of receiver 13. An RF receive signal 134 is received onto antenna 18, passes through duplexer 17, is amplified by low noise amplifier 34, and is then down-converted by the quadrature mixer of receiver 13. The quadrature mixer outputs down-converted in-phase signal 86 and down-converted quadrature-phase signal 88. Signals 86 and 88 are then filtered and digitized. Digitized and filtered in-phase signal 86 is received by fifth multiplier 97 and seventh multiplier 99, and digitized and filtered quadrature-phase signal 88 is received by sixth multiplier 98 and eighth multiplier 100. The multiplication factors calculated in the estimation mode are then used to govern how much of each of signal 86 and 88 will be added to the other signal by second correction circuit 44.

For example, an attenuated component of digitized and filtered in-phase signal 86 is generated using the fifth multiplication factor. DSP 14 sends a digital control signal 135 that includes the fifth multiplication factor to multiplier 97. Multiplier 97 attenuates the digitized and filtered in-phase signal 86 by an amount corresponding to the fifth multiplication factor. In addition, an attenuated component of digitized and filtered down-converted quadrature-phase signal 88 is generated when multiplier 98 attenuates the amplitude of digitized and filtered down-convened quadrature-phase signal 88 by an amount corresponding to the sixth multiplication factor. Then, the attenuated component of signal 88 is added to the attenuated component of signal 86. Third adder 101 receives the output of fifth multiplier 97 and sixth multiplier 98 and generates a corrected I-phase Rx component 136.

In addition, multiplier 99 attenuates digitized and filtered in-phase signal 86 by an amount corresponding to the seventh multiplication factor, and multiplier 100 attenuates digitized and filtered down-convened quadrature-phase signal 88 by an amount corresponding to the eighth multiplication factor. Fourth adder 102 receives the output of seventh multiplier 99 and eighth multiplier 100 and generates a corrected Q-phase Rx component 137. Fourier transform calculation circuit 45 then transforms corrected I-phase Rx component 136 and corrected Q-phase Rx component 137 into a corrected baseband signal 138. The digital streams of corrected baseband signal 138 are then converted into symbols for subsequent digital signal processing. Second correction circuit 44 has removed the gain and phase impairments $\epsilon_b$ and $\phi_b$ from corrected baseband signal 138 that were introduced by the quadrature mixer of receiver 13. Thus, in the correction mode, transceiver 10 both pre-processes data signals to be transmitted and post-processes received data signals to correct for the four I/Q gain and phase mismatches introduced by the quadrature mixers of the transmitter and receiver. First correction circuit 22 pre-processes data signal 129 before data signal 129 is up-converted and transmitted so as to correct for the gain impairment $\epsilon_a$ and the phase mismatch $\phi_a$ that will be introduced by transmitter 12. Second correction circuit 44 post-processes RF receive signal 134 after signal 134 is received and down-converted so as to correct for the gain impairment $\epsilon_b$ and the phase mismatch $\phi_b$ that were introduced by receiver 13. As indicated by equation 107, when first correction circuit 22 and second correction circuit 44 compensate for the I/Q impairments by adding in-phase and quadrature-phase components to each other, the frequency coefficient $C_{1-1}$ increases and the frequency coefficients $C_{1-1}$, $C_{1-2}$ and $C_{1-2}$ decrease. In the ideal case where first correction circuit 22 and second correction circuit 44 completely correct for the four I/Q impairments, the frequency coefficients $C_{-1}$, $C_{1-2}$ and $C_{1-2}$ have no amplitudes. In this ideal case, the diagram of FIG. 10 would exhibit only one peak, the peak near frequency bin –40 corresponding to frequency coefficients $C_{1-1}$. Where the characteristics of the channel connection are not ideal and where RF loop-back path 11 causes gain scaling and a time delay across the channel connection, the impairments of the channel connection impact the frequency coefficients. Thus, impairments of the channel connection change the phase of all sidebands equally and do not change the relative magnitudes of the frequency coefficients.

In one embodiment, during normal operation while a user of the OFDM system is sending and receiving data signals, the operation of transceiver 10 alternates between transmitting user data and re-calibrating the transmit and receive chains. After data signals have been transmitted and received for a predetermined amount of time, transceiver 10 enters its estimation mode. In one implementation, frequency synthesizer 36 changes the frequency $\omega_b$ of LO signal 47 that is used in the estimation mode from the frequency used to down-convert received data signals. For example, the frequency $\omega_b$ is changed to be within about 100 kilohertz of the frequency $\omega_a$ generated by transmit frequency synthesizer 28 and used to up-convert signals to be transmitted. Transceiver 10 then generates reference signal 62, evaluates evaluation signal 105, and determines the multiplication factors. Then after the transmit and receive chains have been re-calibrated, transceiver 10 alternates back to the correction mode and transmits and receives data signals containing voice and data communications. In the correction mode, transceiver 10 again uses the original frequency $\omega_b$ of LO signal 47 that is specified by the governmental spectrum licensing authority. In another embodiment, transceiver 10 enters its estimation mode only on powering up the mobile communication device that includes transceiver 10. After calibration at powering up, transceiver operates in the correction mode.

Figure 25:
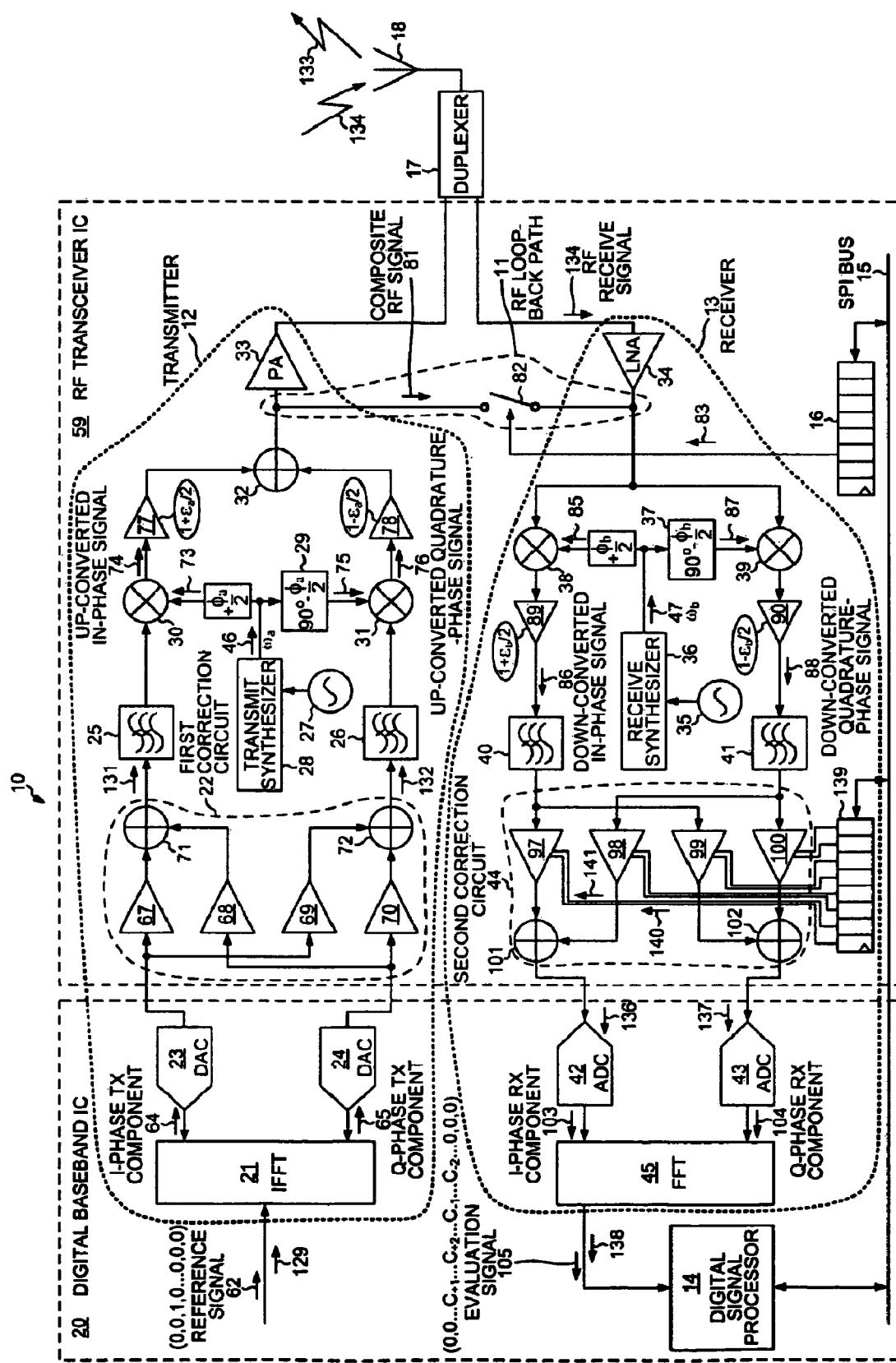
FIG. 25 is a schematic block diagram of another embodiment of transceiver of FIG. 1 in which the correction circuits are located in an analog integrated circuit.

FIG. 25 is a schematic block diagram of an embodiment of transceiver 10 in which the correction circuits are located in analog RF transceiver IC 19 instead of in digital baseband IC 20. Thus, the method of simultaneously estimating the gain and phase mismatches of both the transmitter and the receiver corrects for the I/Q impairments in the analog domain. First correction circuit 22 is located on analog RF transceiver IC 19 and receives both an analog I-phase Tx component output by first DAC 23 as well as an analog Q-phase Tx component output by DAC 24. Attenuated components of I-phase Tx component 64 and Q-phase Tx component 65 are added to each other in the analog domain and output as corrected I-phase Tx component 131 and corrected Q-phase Tx component 132. Similarly, second correction circuit 44 is also located on analog RF transceiver IC 19 and receives filtered down-converted in-phase signal 86 and filtered down-converted quadrature-phase signal 88. Second correction circuit 44 then adds attenuated components of signals 86 and 88 to each other and outputs corrected I-phase Rx component 136 and corrected Q-phase Rx component 137. Corrected I-phase Rx component 136 is then digitized by ADC 42, and corrected Q-phase Rx component 137 is digitized by ADC 43.

The analog correction circuits of the embodiment of FIG. 25 are controlled by I/Q correction registers. Digital baseband IC 20 communicates the multiplication factors and other correction information across SPI serial bus 15, through the I/Q correction registers, and to the correction circuits. For example, FIG. 25 shows an I/Q correction register 139 that controls multipliers 97-100 of second correction circuit 44. The I/Q correction registers that control first correction circuit 22 are not shown in FIG. 25. In one aspect, multiplier 97 is controlled by correction signals received from I/Q correction register 139. A control signal 140 is asserted when a digital one is written into the eighth bit of I/Q correction register 139, and a control signal 141 is asserted when a digital one is written into the seventh bit of I/Q correction register 139. In other aspects, more than two control signals are used to set the multiplication factor of each multiplier. Digital baseband IC 20 sets the multiplication factor of multiplier 97 by communicating across SPI serial bus 15 and writing the digital values 00, 01, 10 or 11 into the seventh and eighth bits of I/Q correction register 139.

Figure 26:
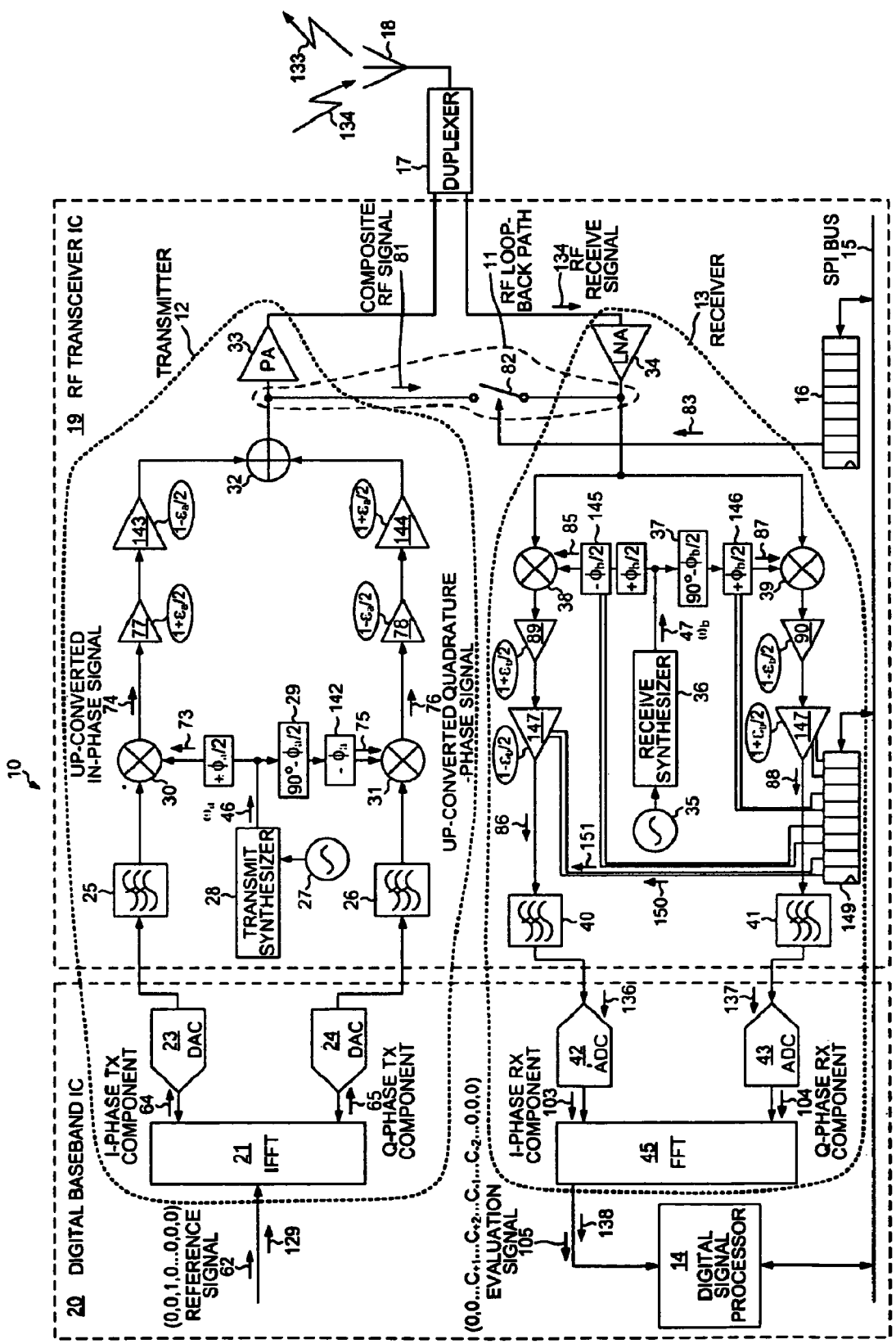
FIG. 26 is a schematic block diagram of yet another embodiment of the transceiver of FIG. 1 in which the gain and phase impairments are not pre-processed and post-processed by correction circuits, but rather are corrected at their sources in the quadrature mixers.

FIG. 26 is a schematic block diagram of another embodiment of transceiver 10 in which the I/Q impairments are not pre-processed and post-processed, but rather are corrected at their source. The embodiment of FIG. 26 includes correction multipliers and correction shifters within the quadrature mixers that compensate for the gain mismatch and phase mismatches. Without correction, in-phase transmitter LO signal 73 has a phase that is shifted $\omega_a$ from quadrature-phase transmitter LO signal 75. In FIG. 26, the "90°−$\phi_a/2$" in transmit phase shifter 29 and the "+$\phi_a/2$" above phase shifter 29 represent the phase mismatch of $\phi_a$ introduced by the quadrature mixer of transmitter 12. In one embodiment, analog transmit phase shifter 29 is controlled by correction signals from an I/Q correction register. The phase shift generated by transmit phase shifter 29 is changed such that the phase mismatch $\phi_a$ is eliminated. DSP 14 uses the phase mismatch $\phi_a$ obtained from equation 119 to control transmit phase shifter 29 by writing bits of the I/Q correction register. In another embodiment, a correction shifter 142 is added to the quadrature mixer in order to shift the phase of quadrature-phase transmitter LO signal 75 by an amount −$\phi_a$ that corrects for the +$\phi_a$ phase mismatch introduced by the quadrature mixer.

In FIG. 26, multipliers 77 and 78 represent the gain mismatch of $\epsilon_a$ between up-converted in-phase signal 74 and up-converted quadrature-phase signal 76. An analog, voltage-controlled correction amplifier 143 is added to the quadrature mixer in order to attenuate signal 74 by an amount −$\epsilon_a/2$ that corrects for the +$\epsilon_a/2$ gain mismatch introduced into signal 74 by the quadrature mixer. Similarly, an analog, voltage-controlled correction amplifier 144 is added to the quadrature mixer in order to amplify signal 76 by an amount +$\epsilon_a/2$ that corrects for the −$\epsilon_a/2$ gain mismatch introduced into signal 76 by the quadrature mixer. DSP 14 uses the gain mismatch $\epsilon_a$ obtained from equation 115 in FIG. 17 to control the voltage-controlled amplifiers 143 and 144 by writing to bits of an I/Q correction register. In some implementations, the gain mismatch $\epsilon_a$ is a negative amount, such that amplifier 143 amplifies signal 74 and amplifier 144 attenuates signal 76.

The embodiment of FIG. 26 also includes correction multipliers and correction shifters within the quadrature mixer of receiver 13. In one embodiment, both quadrature mixers of the transmit and receive paths have a single correction shifter that shifts the LO signal to one mixer by $\phi_a$ or $\phi_b$, such as correction shifter 142. In another embodiment, each quadrature mixer has two correction shifters, each of which shifts the LO signal to one of the two mixers by $\phi/2$. FIG. 26 illustrates the double-shifter embodiment with regard to the quadrature mixer of receiver 13. A correction shifter 145 is added to the receive quadrature mixer in order to shift the phase of in-phase receiver LO signal 85 by an amount −$\phi_b/2$ that corrects for the +$\phi_b/2$ phase mismatch introduced into signal 85 by the quadrature mixer. Similarly, a correction shifter 146 is added to the receive quadrature mixer in order to shift the phase of quadrature-phase receiver LO signal 87 by an amount +$\phi_b/2$ that corrects for the −$\phi_b/2$ phase mismatch introduced into signal 87 by the quadrature mixer. In addition, a correction amplifier 147 is added to the quadrature mixer in order to attenuate down-converted in-phase signal 86 by an amount −$\epsilon_a/2$ that corrects for the +$\epsilon_a/2$ gain mismatch introduced into signal 86 by the quadrature mixer. Similarly, a correction amplifier 148 is added to the quadrature mixer in order to amplify down-converted quadrature-phase signal 88 by an amount +$\epsilon_a/2$ that corrects for the −$\epsilon_a/2$ gain mismatch introduced into signal 88 by the quadrature mixer.

The correction shifters and correction multipliers of the embodiment of FIG. 26 are controlled by I Q correction registers. Digital baseband IC 20 communicates correction information across SPI serial bus 15, through the I Q correction registers, and to the correction shifters and correction multipliers. The correction information includes the gain mismatches $\epsilon_a$ and $\epsilon_b$ obtained from equations 115-118 in FIG. 17 and the phase mismatches $\phi_a$ and $\phi_b$ obtained from equations 119-120. For example, FIG. 26 shows an I/Q correction register 149 that controls correction shifters 145-146 and correction multipliers 147-148 of the quadrature mixer of receiver 13. The I/Q correction registers that control the correction shifters and correction multipliers of the quadrature mixer of transmitter 12 are not shown in FIG. 26. The correction shifters and correction multipliers are controlled by correction signals received from I/Q correction register 149. For example, a control signal 150 is asserted when a digital one is written into the eighth bit of I/Q correction register 149, and a control signal 151 is asserted when a digital one is written into the seventh bit of I/Q correction register 149. In other examples, more than two control signals are used to set the attenuation amount for correction multiplier 147. Digital baseband IC 20 sets the attenuation and amplification amounts for correction multipliers 147-148 and the phase delays for correction shifters 145-146 by communicating across SPI serial bus 15 and writing digital values into the eight bits of I/Q correction register 149.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair. DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although a transceiver that determines the gain and phase mismatches of both the transmit and receive paths after observing a single evaluation signal has been described in connection with certain specific embodiments for instructional purposes, the transceiver is not limited thereto. For example, transceiver 10 is described as performing the calculation of the estimation mode in a digital signal processor. In other embodiments, the calculations are performed in other parts of the digital baseband IC. For example, the calculations are performed in an embedded microcontroller or in embedded programmable logic. Transceiver 10 is described as controlling the correction circuits, correction shifters and correction multipliers using control signals sent from registers. In other embodiments, control signals are sent directly from the digital baseband IC. The method of simultaneously calculating all four I/Q impairments is described as being performed in a mobile communication device. In other embodiments, the method is performed in a base station that receives signals from and transmits signals to mobile communication devices. The previous description of the disclosed embodiments is provided to enable any person skilled in the art to make or use a stepped gain mixer. Various modifications to these embodiments will be readily apparent to those skilled in the art, and the generic principles defined herein may be applied to other embodiments without departing from the spirit or scope of disclosed subject matter. Accordingly, the disclosed method for determining the gain and phase mismatches of both the transmit and receive paths after observing a single evaluation signal is not intended to be limited to the embodiments shown herein but is to be accorded the widest scope consistent with the principles and novel features disclosed herein.

What is claimed is:

1. A method comprising:
(a) receiving a single tone reference signal into a quadrature mixer of a transmit path, wherein the transmit path exhibits a gain mismatch and a phase mismatch;
(b) using the single tone reference signal to generate an up-converted RF signal;
(c) transmitting the up-converted RF signal via an RF loop-back path to a quadrature mixer of a receive path, wherein the receive path exhibits a gain mismatch and a phase mismatch;
(d) using the up-converted RF signal to generate a down-converted evaluation signal, wherein the down-converted evaluation signal is generated as a result of the single tone reference signal being received in (a); and
(e) using the down-converted evaluation signal to determine the gain mismatch of the transmit path, the phase mismatch of the transmit path, the gain mismatch of the receive path, and the phase mismatch of the receive path substantially simultaneously at one time, wherein the evaluation signal has a first sideband tone with a first amplitude, a second sideband tone with a second amplitude, a third sideband tone with a third amplitude and a fourth sideband tone with a fourth amplitude, and wherein the gain mismatch and the phase mismatch of the transmit path and the gain mismatch and the phase mismatch of the receive path are determined based on the first amplitude, the second amplitude, the third amplitude and the fourth amplitude.

2. The method of claim 1, wherein the quadrature mixer of the transmit path is part of a communication device that communicates based on orthogonal frequency-division multiplexing (OFDM) and frequency division duplexing (FDD).

3. The method of claim 2, wherein the communication device performs regular transmission of data signals, and wherein the determining the gain mismatch and the phase mismatch of the transmit path and the gain mismatch and the phase mismatch of the receive path is performed without using hardware other than the RF loop-back path that is not otherwise used in the regular transmission of data signals.

4. A method comprising:
(a) generating a reference signal;
(b) transforming the reference signal into an in-phase Tx component and a quadrature-phase Tx component;
(c) generating an up-converted in-phase signal by mixing the in-phase Tx component with an in-phase transmitter oscillator signal;
(d) generating an up-converted quadrature-phase signal by mixing the quadrature-phase Tx component with a quadrature-phase transmitter oscillator signal;
(e) generating a composite RF signal by adding the up-converted in-phase signal and the up-converted quadrature-phase signal;
(f) generating a down-converted in-phase signal by mixing the composite RF signal with an in-phase receiver oscillator signal;
(g) generating a down-converted quadrature-phase signal by mixing the composite RF signal with a quadrature-phase receiver oscillator signal;
(h) transforming the down-converted in-phase signal and the down-converted quadrature-phase signal into an evaluation signal, wherein the evaluation signal has a first sideband tone with a first characteristic, a second sideband tone with a second characteristic, a third sideband tone with a third characteristic and a fourth sideband tone with a fourth characteristic;

(i) determining the first characteristic, the second characteristic, the third characteristic and the fourth characteristic; and (j) determining an amplitude of the down-converted in-phase signal and an amplitude of the down-converted quadrature-phase signal at which the first characteristic increases and each of the second characteristic, the third characteristic and the fourth characteristic decreases.

5. The method of claim 4, wherein the in-phase transmitter oscillator signal has a first frequency and the in-phase receiver oscillator signal has a second frequency, and wherein the first frequency differs from the second frequency.

6. The method of claim 4, wherein the characteristic is amplitude.

7. The method of claim 4, wherein the first characteristic is a combination of amplitude and phase of the first sideband tone.

8. The method of claim 7, wherein the first characteristic is defined by a complex Fourier coefficient.

9. The method of claim 4, wherein the reference signal is generated in frequency domain and has an amplitude in only one frequency bin.

10. The method of claim 4, wherein the reference signal has a single sideband tone.

11. The method of claim 4, further comprising:

(k) generating an attenuated component of the down-converted in-phase signal;

(l) generating an attenuated component of the down-converted quadrature-phase signal; and (m) adding the attenuated component of the down-converted quadrature-phase signal to the attenuated component of the down-converted in-phase signal.

12. The method of claim 4, wherein the generating in (e) is performed on an analog integrated circuit, and wherein the transforming in (h) is performed on a digital integrated circuit.

13. The method of claim 4, wherein the generating in (e) is performed in a time domain, and wherein the transforming in (h) is performed in a frequency domain.

14. The method of claim 4, wherein the in-phase Tx component has an amplitude and wherein the quadrature-phase Tx component has an amplitude, further comprising:

(k) adjusting the amplitude of the in-phase Tx component and the amplitude of the quadrature-phase Tx component; and (l) adding the adjusted in-phase Tx component to the adjusted quadrature-phase Tx component.

15. A circuit comprising:

a first multiplier that receives a down-converted in-phase signal and generates a first attenuated component signal having an amplitude;

a second multiplier that receives a down-converted quadrature-phase signal and generates a second attenuated component signal having an amplitude, wherein a data signal with a single sideband tone is transmitted and used to generate the down-converted in-phase signal and the down-converted quadrature-phase signal;

a third multiplier that receives the down-converted in-phase signal and generates a third attenuated component signal having an amplitude;

a fourth multiplier that receives the down-converted quadrature-phase signal and generates a fourth attenuated component signal having an amplitude;

a first adder that generates an in-phase component signal by adding the second attenuated component signal to the first attenuated component signal;

a second adder that generates a quadrature-phase component signal by adding the third attenuated component signal to the fourth attenuated component signal; and a Fourier transform calculation circuit that generates a corrected signal using the in-phase component signal and the quadrature-phase component signal, wherein the corrected signal has a first sideband tone with a first characteristic, a second sideband tone with a second characteristic, a third sideband tone with a third characteristic and a fourth sideband tone with a fourth characteristic, and wherein the first multiplier adjusts the amplitude of the first attenuated component signal, the second multiplier adjusts the amplitude of the second attenuated component signal, the third multiplier adjusts the amplitude of the third attenuated component signal and the fourth multiplier adjusts the amplitude of the fourth attenuated component signal all such that the first characteristic increases and the second characteristic, the third characteristic and the fourth characteristic decrease.

16. The circuit of claim 15, wherein the corrected signal is an evaluation signal.

17. The circuit of claim 15, wherein the characteristic is amplitude.

18. The circuit of claim 15, wherein the first characteristic is defined by a complex Fourier coefficient.

19. The circuit of claim 15, wherein the down-converted in-phase signal is filtered and digitized before being received by the first multiplier and by the third multiplier, and wherein the down-converted quadrature-phase signal is filtered and digitized before being received by the second multiplier and by the fourth multiplier.

20. The circuit of claim 15, wherein the down-converted in-phase signal received by the first multiplier and the third multiplier is a digitized down-converted in-phase signal, and wherein the down-converted quadrature-phase signal received by the second multiplier and the fourth multiplier is a digitized down-converted quadrature-phase signal, further comprising:

a first analog-to-digital converter that receives an analog down-converted in-phase signal and outputs the digitized down-converted in-phase signal; and a second analog-to-digital converter that receives an analog down-converted quadrature-phase signal and outputs the digitized down-converted quadrature-phase signal.

21. The circuit of claim 20, wherein the analog down-converted in-phase signal is filtered before being received by the first analog-to-digital converter.

22. The circuit of claim 15, further comprising:

an inverse Fourier transform calculation circuit that receives the data signal and generates an in-phase component and a quadrature-phase component, wherein the in-phase component and the quadrature-phase component are used to generate the down-converted in-phase signal and the down-converted quadrature signal.

23. The circuit of claim 15, wherein the circuit is part of a communication device that communicates based on orthogonal frequency-division multiplexing (OFDM) and frequency division duplexing (FDD).

24. A circuit that operates in a first mode and in a second mode, comprising:

an inverse Fourier transform calculation circuit that outputs an I-phase Tx component and a Q-phase Tx component;

a first correction circuit having a first multiplier and a third multiplier that receive the I-phase Tx component and having a second multiplier and a fourth multiplier that receive the Q-phase Tx component;

a second correction circuit having a fifth multiplier and a seventh multiplier that receive a down-converted in-phase signal and having a sixth multiplier and an eighth multiplier that receive a down-converted quadrature-phase signal, wherein the second correction circuit generates an I-phase Rx component and a Q-phase Rx component;

a Fourier transform calculation circuit that receives the I-phase Rx component and the Q-phase Rx component; and a digital signal processor, wherein in the first mode the inverse Fourier transform calculation circuit receives a reference signal and the Fourier transform calculation circuit generates an evaluation signal, wherein the evaluation signal has a first sideband tone with a first characteristic, a second sideband tone with a second characteristic, a third sideband tone with a third characteristic and a fourth sideband tone with a fourth characteristic, wherein the digital signal processor uses the evaluation signal to determine the first characteristic, the second characteristic, the third characteristic and the fourth characteristic, wherein the digital signal processor determines a first multiplication factor and a third multiplication factor by which the first and the third multipliers attenuate the I-phase Tx component, a second multiplication factor and a fourth multiplication factor by which the second and the fourth multipliers attenuate the Q-phase Tx component, a fifth multiplication factor and a seventh multiplication factor by which the fifth and the seventh multipliers attenuate the down-converted in-phase signal, and a sixth multiplication factor and an eighth multiplication factor by which the sixth and the eighth multipliers attenuate the down-converted quadrature-phase signal, and wherein the digital signal processor determines the first, second, third, fourth, fifth, sixth, seventh and eighth multiplication factors such that the first characteristic increases and each of the second characteristic, the third characteristic and the fourth characteristic decreases.

25. The circuit of claim 24, wherein in the second mode the inverse Fourier transform calculation circuit receives a data signal and the Fourier transform calculation circuit outputs a corrected baseband signal, and wherein the circuit that operates in a first mode and in a second mode uses the first, second, third, fourth, fifth, sixth, seventh and eighth multiplication factors determined in the first mode to generate the I-phase Rx component and the Q-phase Rx component received by the Fourier transform calculation circuit in the second mode.

26. The circuit of claim 24, wherein the characteristic is amplitude.

27. The circuit of claim 24, wherein the first characteristic is a combination of amplitude and phase of the first sideband tone.

28. The circuit of claim 24, wherein the first characteristic is defined by a complex Fourier coefficient.

29. The circuit of claim 24, wherein the down-converted in-phase signal is filtered and digitized before being received by the fifth multiplier and by the seventh multiplier, and wherein the down-converted quadrature-phase signal is filtered and digitized before being received by the sixth multiplier and by the eighth multiplier.

30. The circuit of claim 24, wherein the first correction circuit further comprises a first adder and a second adder, wherein the first adder is coupled to the first multiplier and to the third multiplier, wherein the second adder is coupled to the second multiplier and to the fourth multiplier, wherein the second correction circuit further comprises a third adder and a fourth adder, wherein the third adder is coupled to the fifth multiplier and to the sixth multiplier, and wherein the fourth adder is coupled to the seventh multiplier and to the eighth multiplier.

31. The circuit of claim 24, wherein the first correction circuit outputs I and Q transmit components, and wherein the second correction circuit receives I and Q receive components, further comprising:

a transmit quadrature mixer that receives the I and Q transmit components and outputs a composite RF signal;

a receive quadrature mixer that receives the composite RF signal and outputs the I and Q receive components; and an RF loop-back path over which the composite RF signal is conveyed from the transmit quadrature mixer to the receive quadrature mixer.

32. The circuit of claim 30, wherein the circuit is part of a digital baseband integrated circuit.

33. A non-transitory processor-readable medium for storing instructions operable in a wireless device to:

(a) generate a reference signal;

(b) transform the reference signal into an in-phase Tx component and a quadrature-phase Tx component, wherein an up-converted in-phase signal is generated by mixing the in-phase Tx component with an in-phase transmitter oscillator signal, wherein an up-converted quadrature-phase signal is generated by mixing the quadrature-phase Tx component with a quadrature-phase transmitter oscillator signal, wherein a composite RF signal is generated by adding the up-converted in-phase signal and the up-converted quadrature-phase signal, wherein a down-converted in-phase signal is generated by mixing the composite RF signal with an in-phase receiver oscillator signal, and wherein a down-converted quadrature-phase signal is generated by mixing the composite RF signal with a quadrature-phase receiver oscillator signal;

(c) transform the down-converted in-phase signal and the down-converted quadrature-phase signal into an evaluation signal, wherein the evaluation signal has a first sideband tone with a first characteristic, a second sideband tone with a second characteristic, a third sideband tone with a third characteristic and a fourth sideband tone with a fourth characteristic;

(d) determine the first characteristic, the second characteristic, the third characteristic and the fourth characteristic; and (e) determine an amplitude of the down-converted in-phase signal and an amplitude of the down-converted quadrature-phase signal at which the first characteristic increases and each of the second characteristic, the third characteristic and the fourth characteristic decreases.

34. The non-transitory processor-readable medium of claim 33, wherein the in-phase transmitter oscillator signal has a first frequency and the in-phase receiver oscillator signal has a second frequency, and wherein the first frequency differs from the second frequency.

35. The non-transitory processor-readable medium of claim 33, wherein the first characteristic is a combination of amplitude and phase of the first sideband tone.

36. The non-transitory processor-readable medium of claim 33, wherein the reference signal is generated in frequency domain and has an amplitude in only one frequency bin.

37. The non-transitory processor-readable medium of claim 33, wherein the reference signal has a single sideband tone.

38. The non-transitory processor-readable medium of claim 33, and further for storing instructions operable in the wireless device to:
(k) adjust an amplitude of the in-phase Tx component and an amplitude of the quadrature-phase Tx component; and
(l) add the adjusted in-phase Tx component to the adjusted quadrature-phase Tx component.

39. A circuit comprising:
(a) a first correction circuit that corrects for both an up-conversion phase mismatch and an up-conversion gain mismatch between an up-converted in-phase signal and an up-converted quadrature-phase signal, wherein the first correction circuit multiplies an I-phase Tx component by a first multiplication factor and by a third multiplication factor, and wherein the first correction circuit multiplies a Q-phase Tx component by a second multiplication factor and by a fourth multiplication factor;
(b) a second correction circuit that corrects for both a down-conversion phase mismatch and a down-conversion gain mismatch between a down-converted in-phase signal and a down-converted quadrature-phase signal, wherein the second correction circuit multiplies the down-converted in-phase signal by fifth multiplication factor and by a seventh multiplication factor, wherein the second correction circuit multiplies the down-converted quadrature-phase signal by sixth multiplication factor and by an eighth multiplication factor; and
(c) means for determining the first, second, third, fourth, fifth, sixth, seventh and eighth multiplication factors based on evaluating a single evaluation signal.

40. The circuit of claim 39, wherein the single evaluation signal is generated from a single reference signal, and wherein the single reference signal has a single sideband tone.

41. The circuit of claim 39, wherein the first correction circuit comprises a first adder and a second adder, wherein the first adder is coupled to a first multiplier and to a third multiplier, wherein the second adder is coupled to a second multiplier and to a fourth multiplier, wherein the second correction circuit comprises a third adder and a fourth adder, wherein the third adder is coupled to a fifth multiplier and to a sixth multiplier, wherein the fourth adder is coupled to a seventh multiplier and to an eighth multiplier, and wherein the first, second, third, fourth, fifth, sixth, seventh and eighth multipliers apply the first, second, third, fourth, fifth, sixth, seventh and eighth multiplication factors, respectively.

42. The circuit of claim 39, wherein the circuit is part of a communication device that communicates based on orthogonal frequency-division multiplexing (OFDM) and frequency division duplexing (FDD).

* * * * *